United States Patent
Heo et al.

[11] Patent Number: 5,987,417
[45] Date of Patent: Nov. 16, 1999

[54] DVD AUDIO DISK REPRODUCING DEVICE AND METHOD THEREOF

[75] Inventors: Jung-Kwon Heo, Seoul; Jae-Hoon Heo, Suwon, both of Rep. of Korea

[73] Assignee: Samsung Electronics Co., Ltd., Suwon, Rep. of Korea

[21] Appl. No.: 08/797,290

[22] Filed: Feb. 7, 1997

[30] Foreign Application Priority Data

Jan. 28, 1997 [KR] Rep. of Korea ............ 97-2339

[51] Int. Cl.⁶ ............................................. H04N 5/91
[52] U.S. Cl. ............................ 704/500; 704/230; 369/56; 386/96; 386/10-6; 386/104
[58] Field of Search ............................. 704/500, 501, 704/502, 503, 504, 230; 386/77, 104, 83, 95, 106, 129; 369/54, 59; 395/200.77

[56] References Cited

U.S. PATENT DOCUMENTS

| | | | |
|---|---|---|---|
| 5,745,643 | 4/1998 | Mishina | 386/106 |
| 5,793,898 | 8/1998 | Nakamoto | 382/250 |
| 5,805,537 | 9/1998 | Yamamoto et al. | 369/32 |
| 5,809,245 | 9/1998 | Zenda | 395/200.47 |
| 5,812,790 | 9/1998 | Randall | 395/200.77 |
| 5,844,636 | 12/1998 | Joseph et al. | 348/845 |

*Primary Examiner*—David R. Hudspeth
*Assistant Examiner*—Susan Wieland
*Attorney, Agent, or Firm*—Staas & Halsey

[57] ABSTRACT

A DVD audio disk having information areas in which corresponding audio title information management tables are stored, and corresponding data areas in which audio packs of a linear PCM mode are stored, wherein a first, second or third number of quantization bits, a corresponding first, second or third sampling frequency, and information relative to the number of audio channels are all recorded on each audio title information management table. The audio pack includes audio packets made up with the number of quantization bits, the sampling frequency and the information relative to the number of channels all recorded on the title management table, the audio packets further containing audio data.

65 Claims, 32 Drawing Sheets

VTS_MU_AST_ATR(1)

| b191 b190 | b189 b188 | b187 b186 b185 b184 |
|---|---|---|
| AUDIO MIXED FLAG | ACH0 MIX MODE | AUDIO CHANNEL CONTENTS |

| b183 b182 | b181 b180 | b179 b178 b177 b176 |
|---|---|---|
| AUDIO MIXED FLAG | ACH1 MIX MODE | AUDIO CHANNEL CONTENTS |

| b175 b174 | b173 b172 | b171 b170 b169 b168 |
|---|---|---|
| AUDIO MIXED PHASE | ACH2 MIX MODE | AUDIO CHANNEL CONTENTS |

| b167 b166 | b165 b164 | b163 b162 b161 b160 |
|---|---|---|
| AUDIO MIXED PHASE | ACH3 MIX MODE | AUDIO CHANNEL CONTENTS |

| b159 b158 | b157 b156 | b155 b154 b153 b152 |
|---|---|---|
| AUDIO MIXED PHASE | ACH4 MIX MODE | AUDIO CHANNEL CONTENTS |

| b151 b150 | b149 b148 | b147 b146 b145 b144 |
|---|---|---|
| AUDIO MIXED PHASE | ACH5 MIX MODE | AUDIO CHANNEL CONTENTS |

| b143 b142 | b141 b140 | b139 b138 b137 b136 |
|---|---|---|
| AUDIO MIXED PHASE | ACH6 MIX MODE | AUDIO CHANNEL CONTENTS |

| b135 b134 | b133 b132 | b131 b130 b129 b128 |
|---|---|---|
| AUDIO MIXED PHASE | ACH7 MIX MODE | AUDIO CHANNEL CONTENTS |

FIG. 3A
PRIOR ART

VTS_MU_AST_ATR(2)

| b127 | b126 | b125 | b124 | b123 | b122 | b121 | b120 |
|------|------|------|------|------|------|------|------|
| α0 | | | | | | | |

| b119 | b118 | b117 | b116 | b115 | b114 | b113 | b112 |
|------|------|------|------|------|------|------|------|
| β0 | | | | | | | |

| b111 | b110 | b109 | b108 | b107 | b106 | b105 | b104 |
|------|------|------|------|------|------|------|------|
| α1 | | | | | | | |

| b103 | b102 | b101 | b100 | b99 | b98 | b97 | b96 |
|------|------|------|------|-----|-----|-----|-----|
| β1 | | | | | | | |

| b95 | b94 | b93 | b92 | b91 | b90 | b89 | b88 |
|-----|-----|-----|-----|-----|-----|-----|-----|
| α2 | | | | | | | |

| b87 | b86 | b85 | b84 | b83 | b82 | b81 | b80 |
|-----|-----|-----|-----|-----|-----|-----|-----|
| β2 | | | | | | | |

| b79 | b78 | b77 | b76 | b75 | b74 | b73 | b72 |
|-----|-----|-----|-----|-----|-----|-----|-----|
| α3 | | | | | | | |

| b71 | b70 | b69 | b68 | b67 | b66 | b65 | b64 |
|-----|-----|-----|-----|-----|-----|-----|-----|
| β3 | | | | | | | |

| b63 | b62 | b61 | b60 | b59 | b58 | b57 | b56 |
|-----|-----|-----|-----|-----|-----|-----|-----|
| α4 | | | | | | | |

| b55 | b54 | b53 | b52 | b51 | b50 | b49 | b48 |
|-----|-----|-----|-----|-----|-----|-----|-----|
| β4 | | | | | | | |

| b47 | b46 | b45 | b44 | b43 | b42 | b41 | b40 |
|-----|-----|-----|-----|-----|-----|-----|-----|
| α5 | | | | | | | |

| b39 | b38 | b37 | b36 | b35 | b34 | b33 | b32 |
|-----|-----|-----|-----|-----|-----|-----|-----|
| β5 | | | | | | | |

| b31 | b30 | b29 | b28 | b27 | b26 | b25 | b24 |
|-----|-----|-----|-----|-----|-----|-----|-----|
| α6 | | | | | | | |

| b23 | b22 | b21 | b20 | b19 | b18 | b17 | b16 |
|-----|-----|-----|-----|-----|-----|-----|-----|
| β6 | | | | | | | |

FIG. 3B PRIOR ART

VTS_MU_AST_ATR_EXT(1)

| b39 b38 | b37 b36 | b35 b34 b33 b32 |
|---|---|---|
| AUDIO MIXED FLAG | ACH8 MIX MODE | AUDIO CHANNEL CONTENTS |

| b31 b30 | b29 b28 | b27 b26 b25 b24 |
|---|---|---|
| AUDIO MIXED FLAG | ACH9 MIX MODE | AUDIO CHANNEL CONTENTS |

| b23 b22 | b21 b20 | b19 b18 b17 b16 |
|---|---|---|
| AUDIO MIXED FLAG | ACH10 MIX MODE | AUDIO CHANNEL CONTENTS |

| b15 b14 | b13 b12 | b11 b10 b9 b8 |
|---|---|---|
| AUDIO MIXED FLAG | ACH11 MIX MODE | AUDIO CHANNEL CONTENTS |

| b7 b6 | b5 b4 | b3 b2 b1 b0 |
|---|---|---|
| AUDIO MIXED FLAG | ACH12 MIX MODE | AUDIO CHANNEL CONTENTS |

FIG. 13A
PRIOR ART

VTS_MU_AST_ATR_EXT(2)

| b79 | b78 | b77 | b76 | b75 | b74 | b73 | b72 |
|-----|-----|-----|-----|-----|-----|-----|-----|
| | | | $\alpha 8$ | | | | |

| b71 | b70 | b69 | b68 | b67 | b66 | b65 | b64 |
|-----|-----|-----|-----|-----|-----|-----|-----|
| | | | $\beta 8$ | | | | |

| b63 | b62 | b61 | b60 | b59 | b58 | b57 | b56 |
|-----|-----|-----|-----|-----|-----|-----|-----|
| | | | $\alpha 9$ | | | | |

| b55 | b54 | b53 | b52 | b51 | b50 | b49 | b48 |
|-----|-----|-----|-----|-----|-----|-----|-----|
| | | | $\beta 9$ | | | | |

| b47 | b46 | b45 | b44 | b43 | b42 | b41 | b40 |
|-----|-----|-----|-----|-----|-----|-----|-----|
| | | | $\alpha 10$ | | | | |

| b39 | b38 | b37 | b36 | b35 | b34 | b33 | b32 |
|-----|-----|-----|-----|-----|-----|-----|-----|
| | | | $\beta 10$ | | | | |

| b31 | b30 | b29 | b28 | b27 | b26 | b25 | b24 |
|-----|-----|-----|-----|-----|-----|-----|-----|
| | | | $\alpha 11$ | | | | |

| b23 | b22 | b21 | b20 | b19 | b18 | b17 | b16 |
|-----|-----|-----|-----|-----|-----|-----|-----|
| | | | $\beta 11$ | | | | |

| b15 | b14 | b13 | b12 | b11 | b10 | b9 | b8 |
|-----|-----|-----|-----|-----|-----|-----|-----|
| | | | $\alpha 12$ | | | | |

| b7 | b6 | b5 | b4 | b3 | b2 | b1 | b0 |
|----|----|----|----|----|----|----|----|
| | | | $\beta 12$ | | | | |

FIG. 13B
PRIOR ART

DVD AUDIO DISK REPRODUCING DEVICE AND METHOD THEREOF

BACKGROUND OF THE INVENTION

1. Field of the Invention

The present invention relates to an audio disk, a device and method for reproducing audio data recorded thereon, and more particularly, to a disk on which high-quality audio data is recorded and a device and method for reproducing audio data recorded on the disk.

2. Description of the Related Art

Generally speaking, audio data recorded on a compact disk (CD) is sampled at 44.1 KHz, and each of the samples is audio data quantized by 16 bits. Such a CD is advantageous in usage and storage, as compared with a phonograph record (LP), while it has often been stated that the CD has a decreased sound quality. For instance, in the case that audio data sampled at 44.1 KHz and quantized by 16 bits is reproduced, it is difficult to reproduce the original sound and it may be deteriorated as compared with the disk used in the generation prior to CD. Actually, human beings' audible range may be over 20 KHz, and the dynamic range should be 120 dB. With the CD, it is impossible to record or reproduce audio data related to multi-channel music which has increasingly concentrated interest, because it can record only an audio signal of a maximum of two channels.

Coping with those problems, there have been suggested methods of improving the sound quality which is reproduced, by increasing the sampling frequency of the audio data and the number of recording channels.

Currently, one kind of disk reproducing device is designed to reproduce a variety of disks. One of those disks is a digital versatile disk (DVD). With the DVD, video and audio data is recorded at a high density, and the video data is recorded in the MPEG format. The audio data is recorded in the linear pulse code modulation (PCM), Dolby AC-3, or MPEG format. The device for reproducing the DVD video disk has a configuration of reproducing video/audio data so as to retrieve the video/audio data recorded on the DVD video disk.

In each of information areas of the DVD video disk, a video title set information management table (VTSI_MAT) is recorded, and in the data areas sequential thereto, the audio/video data are recorded. The audio data recorded on the data areas of the DVD video disk have the structure of an audio pack. Here, first, the VTSI_MAT and then the structure of the audio pack will be discussed.

As mentioned above, the DVD video disk has the VTSI_MAT which contains information for reproducing video data and audio data. This is shown in the following tables 1a, 1b, 2a and 2b.

TABLE 1a

| RBP | | Contents | Number of Bytes |
|---|---|---|---|
| 0 to 11 | VTS_ID | VTS Identifier | 12 bytes |
| 12 to 15 | VTS_EA | END address of VTS | 4 bytes |
| 16 to 27 | Reserved | Reserved | 12 bytes |
| 28 to 31 | VTSI_EA | End address of VTSI | 4 bytes |
| 32 to 33 | VERN | Version number of DVD Video Specification | 2 bytes |
| 34 to 37 | VTS_CAT | VTS Category | 4 bytes |
| 38 to 127 | Reserved | Reserved | 90 bytes |
| 128 to 131 | VTSI_MAT_EA | End address of VTSI_MAT | 4 bytes |

TABLE 1b

| 132 to 191 | Reserved | Reserved | 60 bytes |
|---|---|---|---|
| 192 to 195 | VTSM_VOBS_SA | Start address of VTSM_VOBS | 4 bytes |
| 196 to 199 | VTS_VOBS_SA | Start address of VTSTT_VOBS | 4 bytes |
| 200 to 203 | VTS_PTT_SR.PPT_SA | Start address of VTS_PTT_SRPT | 4 bytes |
| 204 to 207 | VTS_PGCIT_SA | Start address of VTS_PFCIT | 4 bytes |
| 208 to 211 | VTSM_PGCI_UT_SA | Start address of VTSM_PGCI_UT | 4 bytes |
| 212 to 215 | VTS_TMAPT_SA | Start address of VTS_TMAPT | 4 bytes |
| 216 to 219 | VTSM_C_ADT_SA | Start address of VTSM_C_ADT | 4 bytes |
| 220 to 223 | VTSM_VOBU_ADMAP_SA | Start address of VTSM_VOBU_ADMAP | 4 bytes |
| 224 to 227 | VTS_C_AST_SA | Start address of VTS_C_ADT | 4 bytes |
| 228 to 231 | VTS_VOBU_ADMAP_SA | Start address of VTS_VOBU_ADMAP | 4 bytes |

TABLE 2a

| RBP | | Contents | Number of Bytes |
|---|---|---|---|
| 232 to 255 | Reserved | Reserved | 24 bytes |
| 256 to 257 | VTSM_V_ATR | Video attribute of VTSM | 2 bytes |
| 258 to 259 | VTSM_AST_Ns | Number of Audio streams of VTSM | 2 bytes |
| 260 to 267 | VTSM_AST_ATR | Audio stream attribute of VTSM | 8 bytes |
| 268 to 323 | Reserved | Reserved | 56 bytes |
| 324 to 339 | Reserved | Reserved | 16 bytes |

TABLE 2a-continued

| RBP | | Contents | Number of Bytes |
|---|---|---|---|
| 340 to 341 | VTSM_SPST_Ns | Number of Sub-picture streams of VTSM | 2 bytes |
| 342 to 347 | VTSM_SPST_ATR | Sub-picture stream attribute of VTSM | 6 bytes |

TABLE 2b

| 348 to 511 | Reserved | Reserved | 164 bytes |
|---|---|---|---|
| 512 to 513 | VTS_V_ATR | Video attribute of VTS | 2 bytes |
| 514 to 515 | VTSM_AST_Ns | Number of Audio streams of VTS | 2 bytes |
| 516 to 579 | VTS_AST_ATRT | Audio stream attribute table of VTS | 6.4 bytes |
| 580 to 595 | Reserved | Reserved | 16 bytes |
| 596 to 597 | VTS_SPST_Ns | Number of Sub-Picture streams of VTS | 2 bytes |
| 598 to 789 | VTS_SPST_ATRT | Sub-picture stream attribute table of VTS | 192 bytes |
| 790 to 791 | Reserved | Reserved | 2 bytes |
| 792 to 983 | VTS_MU_AST_ATRT | Multichannel Audio stream attribute table of VTS | 192 bytes |
| 984 to 1023 | Reserved | Reserved | 40 bytes |
| 1024 to 2047 | Reserved | Reserved | 1024 bytes |

In the VTSI_MAT of tables 1a, 1b, 2a and 2b, VTSM_AST_ATR of RBP 260–267 indicates the audio stream attribute of VTSM_VOBS, which is shown in FIG. 1. The respective fields' values become the internal information of the audio stream of VTSM_VOBS. Referring to FIG. 1, the information of the audio coding mode recorded on b63-b61 is stored as in the following table 3.

TABLE 3

| b63–b61 | Audio Coding Mode |
|---|---|
| 000b | Dolby AC-3 |
| 010b | MPEG-1 or MPEG-2 where no extension bit stream exists |
| 011b | MPEG-1 where extension bit stream exists |
| 100b | Linear PCM Audio |
| others | Reserved |

In b55-b54, quantization/DRC information is stored as follows. If the audio coding mode is "000b", 11b is recorded. If the audio coding mode is 010b or 011b, the quantization information is defined as follows.

00b: the dynamic range control data is not present in the MPEG audio stream.

01b: the dynamic range control data is present in the MPEG audio stream.

10b: reserved

11b: reserved

If the audio coding mode is 100b, the quantization information is stored as shown in table 4.

TABLE 4

| b55–b54 | Quantization DRC |
|---|---|
| 00b | 16 bits |
| 01b | 20 bits |
| 10b | 24 bits |
| 11b | Reserved | b53-b52, indicative of sampling frequency fs in FIG. 1, is shown in table 5.

TABLE 5

| b53–b52 | fs |
|---|---|
| 00b | 48 KHz |
| 01b | 96 KHz |
| 10b | Reserved |
| 11b | Reserved | b50-b28, indicative of the number of audio channels in FIG. 1, is shown in table 6.

TABLE 6

| b50–b28 | Number of Audio Channels |
|---|---|
| 000b | 1ch (mono) |
| 001b | 2ch (stereo) |
| 010b | 3ch (nultichannel) |
| 011b | 4ch (multichannel) |
| 100b | 5ch (multichannel) |
| 101b | 6ch (multichannel) |
| 110b | 7ch (multichannel) |
| 111b | 8ch (multichannel) |
| others | Reserved |

In the VTSI_MAT of the tables 1a, 1b, 2a and 2b, VTS_AST_ATRT of RBP 516–579 indicates the audio stream attribute of VTS, which is shown in FIG. 2. The respective fields' values become the internal information of the audio stream of VTSM_VOBS. Referring to FIG. 2, the information of the audio coding mode recorded on b63-b61 is stored as in the following table 7.

TABLE 7

| b63–b61 | Audio Coding Mode |
|---|---|
| 000b | Dolby AC-3 |
| 010b | MPEG-1 or MPEG-2 where no extension bit stream exists |
| 011b | MPEG-2 where extension bit stream exists |
| 100b | Linear PCM Audio |
| 110b | DTS (option) |
| 111b | SDDS (option) |
| others | Reserved |

The multi-channel extension of b60 is an area which stores information indicative of whether the multi-channel extension is executed or not. If 0b is recorded, this means that the multi-channel extension is not selected. If 1b is recorded, this means that the multi-channel extension is performed according to the information of VTS_MU_AST_ATRT recorded on RBP 792–983.

The audio type of b59-b58 is shown as in the following table 8.

TABLE 8

| b59–b59 | Audio Type |
|---|---|
| 00b | Not Specified |
| 01b | Language Included |
| others | Reserved |

The audio application mode of b57-56 is shown in the following table 9.

TABLE 9

| b57–b56 | Audio Application Mode |
|---|---|
| 00b | Not Specified |
| 01b | Karaoke Mode |
| 10b | Surround Mode |
| 11b | Reserved |

The quantization/DRC, sampling frequency fs, and the number of audio channels are shown in tables 4, 5, and 6, respectively.

In the VTSI_MAT of tables 1a, 1b, 2a and 2b, the VTS_MU_AST_ATRT of RBP 792–983 indicates the multi-channel audio stream attribute table of VTS, which is shown in FIGS. 3A and 3B. This VTS_MU_AST_ATRT has two types, that is, VTS_MU_AST_ATR (1) shown in FIG. 3A and VTS_MU_AST_ATR (2) shown in FIG. 3B.

The DVD reproducing device analyzes the information written in the VTSI management table recorded on the DVD video disk, and reproduces the video/audio data written on the disk. Here, the audio data and video data written on the DVD video disk are made in units of packs. FIG. 4 shows the structure of a pack having no padding packet in the DVD. Referring to FIG. 4, one pack has a size of 2048 bytes, with 14 bytes of pack header and 2034 bytes of packet for video, audio, sub-picture, DSI or PCI. The packet header of 14 bytes contains 4 bytes of pack start code, 6 bytes of SCR, 3 bytes of program_mux_rate, and one byte of stuffing_length.

FIGS. 5A–5E show the structure of an audio pack used in the DVD video. Specifically referring to FIG. 5A which depicts the structure of the linear PCM audio pack, it is made up of 14 bytes of pack header and 2034 bytes of linear audio packet. Here, the audio packet has one byte of packet header, one byte of sub_stream_id, 3 bytes of audio frame information, 3 bytes of audio data information, and one byte to 2013 bytes of linear PCM audio data.

FIG. 5B shows the structure of a Dolby AC-3 audio pack. Referring to FIG. 5B, the pack has 14 bytes of pack header and 2034 bytes of Dolby AC-3 audio packet. The audio packet has one byte of packet header, one byte of sub_stream_id, 3 bytes of audio frame information, and one byte to 2016 bytes of AC-3 audio data.

1e;.5qFIG. 5C shows the structure of an MPEG-1 audio or MPEG-2 audio pack having no extension bitstream. FIGS. 5D and 5E show the structure of an MPEG-2 audio pack having an extension stream. The audio packs shown in FIGS. 5A–5E have the same structure as in tables 10a and 10b, respectively, and private data areas corresponding to the respective formats separately.

TABLE 10a

| Field | Number of Bits | Number of Bytes | Value | Comment |
|---|---|---|---|---|
| packet_start_code_prefix | 24 | 3 | 00 0001b | |
| stream_id | 8 | 1 | 1011 1101b | private_stream_1 |
| PES_packet_length | 16 | 2 | | |
| '10' | 2 | 3 | 10b | |
| PES_scrambling_control | 2 | | 00b | not scrambled |
| PES_priority | 1 | | 0 | no priority |
| data_alignment_indicator | 1 | | 0 | not defined by discriptor |
| copyright | 1 | | 0 | not defined by discriptor |
| original_or_copy | 1 | | 1 or 0 | origina:1, copy:0 |
| PTS_DTS_flags | 2 | | 10b or 00b | |
| ESCR_flag | 1 | | 0 | no ESCR field |
| ES_rate_flag | 1 | | 0 | no ES rate field |
| DSM_trick_mode_flag | 1 | | 0 | no trick mode field |
| additional_copy_info_flag | 1 | | 0 | no copy info field |
| PES_CRC_flag | 1 | | 0 | no CRC field |
| PES_extension_flag | 1 | | 0 or 1 | |
| PES_header_data_length | 8 | | 0 to 15 | |

TABLE 10b

| | | | | |
|---|---|---|---|---|
| '0010' | 4 | 5 | provider defined | Note 1 |
| PTS[32 . . . 30] | 3 | | | |
| marker_bit | 1 | | | |
| PTS[29 . . . 15] | 15 | | | |
| marker_bit | 1 | | | |
| PTS[14 . . . 0] | 15 | | | |
| marker_bit | 1 | | | |
| PES_private_data_flag | 1 | 1 | 0 | Note 2 |
| pack_header_field_flag | 1 | | 0 | |
| program_packet_sequence_counter_flag | 1 | | 0 | |
| P_STD_buffer_flag | 1 | | 1 | |
| Reserved | 3 | | 111b | |

TABLE 10b-continued

| PES_extension_flag_2 | 1 | | 0 | |
|---|---|---|---|---|
| '01' | 2 | 2 | 0lb | Note 2 |
| P_STD_buffer_scale | 1 | | 1 | |
| P_STD_buffer_size | 13 | | 58 | |
| stuffing_byte | — | | 0–7 | |

Note 1 and Note 2 are expressed as follows in tables 10a and 10b.
Note 1: PTS[32 . . . 0] is put into every audio packet containing the first sample of the audio frame.
Note 2: This value is contained only in the first audio packet of each VOB, but not in the succeeding audio packets.

In the audio packet of the linear PCM data having the structure of FIG. 5A, the data written in the individual data areas other than the common data shown in tables 10a and 10b is indicated as in the table 11.

TABLE 11

| Field | Number of Bits | Number of Bytes | Value | Comment |
|---|---|---|---|---|
| sub_stream_id | 8 | 1 | 10100***b | Note 1 |
| number_of_frame_headers | 8 | 3 | Provider Defined | Note 2 |
| first_access_unit_pointer | 16 | | Provider Defined | Note 3 |
| audio_emphasis_flag | 1 | 3 | Provider Defined | Note 4 |
| audio_mute_flag | 1 | | Provider Defined | Note 5 |
| reserved | 1 | | 0 | |
| audio_frame_number | 5 | | Provider Defined | Note 6 |
| Quantization_word_length | 2 | | Provider Defined | Note 7 |
| Audio_sampling_frequency | 2 | | Provider Defined | Note 8 |
| Reserved | 1 | | 0 | |
| number_of_audio_channels | 3 | | Provider Defined | Note 9 |
| Dynamic_range_control | 8 | | Provider Defined | Note 10 |
| | | Audio Date Area (Linear PCM) | | |

In table 11, Note 1–Note 10 are as follows.
Note 1: *** indicates the decoding audio data stream number.
Note 2: "number_of_frame headers" indicates the number of audio frames containing the first byte in the corresponding audio packet.
Note 3: The access unit is an audio frame. The first_access_unit indicates the first audio frame containing the first byte in the corresponding audio packet.
Note 4: "audio_emphasis_flag" indicates the state of emphasis. If the audio_sampling_frequency is 96KHz, "emphasis off" is recorded in this area. The emphasis is applied from the sample of the first access unit.
0b: emphasis off
1b: emphasis on
Note 5: "audio mute flag" indicates the state of mute if all the data within the audio frame is zero. Mute is applied from the first sample of the first access unit.
0b: mute off
1b: mute on
Note 6: "audio frame number" is the number within the group of audio frames (GOF) of the first access unit of the audio packet. This number includes "0" to "19".
Note 7: "quantization_word_length" is the number of bits used in the quantization of the audio sample.
00b: 16 bits
01b: 20 bits
10b: 24 bits
11b: reserved
Note 8: "audio_sampling_frequency" is the sampling frequency used in the sampling of the audio sample.
00b: 48 KHz
01b: 96 KHz
others: reserved
Note 9: "number_of_channels" indicates the number of audio channels.
000b: 1ch (mono)
001b: 2ch (stereo)
010b: 3ch (multi-channel)
011b: 4ch (multi-channel)
100b: 5ch (multi-channel)
101b: 6ch (multi-channel)
110b: 7ch (multi-channel)
111b: 8ch (multi-channel)
Note 10: "dynamic range control" indicates the dynamic range control word for compressing the dynamic range from the first access unit.

The stream id in the audio packets shown in FIGS. 5A–5E is determined as follows. First of all, the stream id of the linear PCM audio packet becomes 1011 1101b (private_stream_1), its sub_stream_id being 1010 0*b. Second, the stream id of the AC-3 audio packet becomes 1011 1101b (private_stream_1), its sub_stream_id being 1000 0*b. Third, the stream id of the MPEG audio packet becomes 1100 0*b or 1101 0*b, having no sub_stream_id. In data of a 20-bit mode. FIG. 8C shows the alignment of sample data of a 24-bit mode.

The structure of the packet data of the linear PCM audio is shown in table 13.

TABLE 13

| Stream Mode | | | Data in a packet | | | |
|---|---|---|---|---|---|---|
| Number of Channels | fs(KHz) | Quanti- zation (bits) | Maximum number of samples in a packet | Date size (byte) | Packet stuffing of first/other PES packet (byte) | Padding packet for first/other PES packet (byte) |
| 1(mono) | 48/96 | 16 | 1004 | 2008 | 2/5 | 0/0 |
|  | 48/96 | 20 | 804 | 2010 | 0/3 | 0/0 |
|  | 48/96 | 24 | 670 | 2019 | 0/3 | 0/0 |
| 2(stereo) | 48196 | 16 | 502 | 2008 | 2/5 | 0/0 |
|  | 48/96 | 20 | 402 | 2010 | 0/3 | 0/0 |
|  | 48/96 | 24 | 334 | 2004 | 6/0 | 0/9 |
| 3 | 48/96 | 16 | 334 | 2004 | 6/0 | 0/9 |
|  | 48/96 | 20 | 268 | 2010 | 0/3 | 0/0 |
|  | 48 | 24 | 222 | 1988 | 0/0 | 12/15 |
| 4 | 48/96 | 16 | 250 | 2000 | 0/0 | 10/13 |
|  | 48 | 20 | 200 | 2000 | 0/0 | 10/13 |
|  | 48 | 24 | 166 | 1992 | 0/0 | 18/21 |
| 5 | 48 | 16 | 200 | 2000 | 0/0 | 10/13 |
|  | 48 | 20 | 160 | 2000 | 0/3 | 10/13 |
|  | 48 | 24 | 134 | 2010 | 0/3 | 0/0 |
| 6 | 48 | 16 | 166 | 1992 | 0/0 | 18/21 |
|  | 48 | 20 | 134 | 2010 | 0/3 | 0/0 |
| 7 | 48 | 16 | 142 | 1988 | 0/0 | 22/25 |
| 8 | 48 | 16 | 124 | 1984 | 0/0 | 26/29 | the stream id or sub_stream_id, "***" indicates the decoding audio stream number having a value between 0 and 7. The decoding audio stream number is not allocated with the same number, regardless of the audio compression mode.

FIG. 6 is a diagram for explaining the structure of an audio pack and the audio stream. The audio data used in the DVD can be linear PCM data, Dolby AC-3 data, or MPEG audio data. Such audio stream is divided into a plurality of audio packs, as shown in FIG. 6. These audio packs are controlled in units of 2048 bytes. Here, the coding format of the linear PCM audio data is as shown in table 12.

TABLE 12

| | |
|---|---|
| Sampling frequency (fs) | 48 KHz    96 KHz |
| Sampling Phase | Shall be simultaneous for all channels in a stream |
| Quantization | over 16 bits, 2's complementary code |
| Emphasis | applied (zero point: 50 μs,    not applied pole: 15 μs) |

In Table 12, the linear PCM audio stream data is made up with adjacent GOFs, each GOF having 20 audio frames except the final GOF. The final GOF is made to be equal to or smaller than 20 audio frames.

FIG. 7 shows the structure of an audio frame. Referring to FIG. 7, one audio frame has sample data in accordance with 1/600 seconds. If the sampling frequency fs=48 KHz, one audio frame contains 80 audio sample data. If the sampling frequency fs=96 KHz, one audio frame contains 160 audio sample data. One GOF coincides with 1/30 seconds.

FIGS. 8A–8C show sample data alignments for linear PCM. The sample data includes pieces of the respective channel data sampled at the same time. The size of the sample data varies with the audio stream attribute, each sample data being arranged continuously. FIGS. 8A, 8B and 8C show two formats of sample data at the respective modes. Here, FIG. 8A shows the alignment of sample data of a 16-bit mode. FIG. 8B shows the alignment of sample If the number of samples is smaller than the values of table 13, the length of the padding packet increases to control the pack size. The samples are assigned to the packet boundary. In other words, the sample data of all the audio packets for the linear PCM audio always start with the first byte of $S_{2n}$, as shown in table 13.

Explaining the channel assignment of the linear PCM, ACH0 and ACH1 channels correspond to L channel and R channel in the stereo mode, respectively. The multi-channel mode is coded to be compatible with the stereo mode.

As the audio option of the DVD, there is a digital theater system (DTS). The audio pack of the DTS has the pack header and audio packets, as shown in FIG. 9. The audio pack is aligned to the boundary between LBs within the audio frame units. Referring to FIG. 9, one audio pack includes 14 bytes of pack header and 2021 bytes of DTS audio packet. The DTS audio packet has one byte of packet header, one byte of sub_stream_id, 3 bytes of audio frame information, and one byte to 2016 bytes of DTS audio data. The stream id of the DTS audio packet is 1011 1101b (private_1), its sub_stream_id being 1000 1*b. Here, * of the sub_stream_id indicates the decoding audio stream number having a value of 0 to 7. The decoding audio stream numbers are not assigned with the same number, regardless of the audio compression mode.

The structure of the DTS audio packet is shown in table 10, the private data area being in table 14.

TABLE 14

| Field | Num- ber of Bits | Num- ber of Bytes | Value | Com- ment |
|---|---|---|---|---|
| sub_stream_id | 8 | 1 | 1000 1***b | Note 1 |
| number_of_frame_headers | 8 | 1 | provider defined | Note 2 |

TABLE 14-continued

| Field | Number of Bits | Number of Bytes | Value | Comment |
|---|---|---|---|---|
| First-access_unit_pointer | 16 | 2 | provider defined | Note 3 |
| DTS audio data area | | | | |

In table 14, Note 1–Note 3 are shown in the following.
Note 1: "***" indicates the decoding audio stream number.
Note 2: "number_of_frame_headers" indicates the audio frame number where the first byte exists in the DTS audio packet.
Note 3: The access unit is an audio frame. The first access unit is the audio frame having the first byte within the corresponding audio packet, defined as the PTS of the audio pack.
"first_access_unit_pointer" indicates the first byte address of the first access unit with RBN from the final byte of the information area. If the first byte of the first access unit does not exist, 0000 0000h is recorded.

The DTS is provided with the DTS standards for the multi-channel sound of high quality. The DTS standards are shown in table 15.

TABLE 15

| Bit Rate | mono(1ch) | 64k to 384k bps |
|---|---|---|
| | stereo(2ch) | 96k to 769k bps |
| | 5.1 channel | 256k to 1536k bps |
| Sampling Frequency | 48 KHz Only | |
| Audio Coding Mode | 1/0, 2/0, 3/0, 2/1, 2/2, 3/2, *1 | |
| Protection | CRC disabled | |
| Multilingual Channels | 0 | |

In table 15, *1 is useful to the low frequency effects channels in the respective audio modes.
The DTS audio having such a packet structure can be defined as the multi-channel sound of high quality.

The number of channels available of linear PCM in the DVD video is shown in FIG. 10. In FIG. 10, of maximum bit rate is 6.75 Mbps, and the number of channels is determined as in table 16.

TABLE 16

| Sampling Frequency | Number of Quantization Bits | Number of Channels |
|---|---|---|
| 48 KHz | 16 bit | 8 channel |
| | 20 bit | 6 channel |
| | 24 bit | 5 channel |
| 96 KHz | 16 bit | 4 channel |
| | 20 bit | 3 channel |
| | 24 bit | 2 channel |

The audio data recorded on the DVD video disk has a far better sound quality than that on the CD audio disk. The audio data recorded on the DVD disk has a sampling frequency, and the number of quantization bits and the number of channels greater than those on the CD audio disk. Therefore, the DVD reproducing device can reproduce high sound quality of audio data with multiple channels.

The DVD video disk enables a maximum of 10.08 Mbps of data transmission. With reference to this, it is noted that data sampled at 192 KHz can be reproduced with two channels. These values approximate the maximum sampling frequency designated as the requirements necessary in the next-generation audio in the advanced digital audio conference held in April, 1996 in Japan. If the pure audio data is recorded on the DVD disk, and the DVD reproducing device plays back the DVD audio disk, a better sound quality of the audio signal is obtained.

SUMMARY OF THE INVENTION

Accordingly, it is an object of the present invention to provide a DVD audio disk which is capable of recording sampled digital audio signals in a linear PCM mode up to the number of channels limited by the transmission velocity of the data, by using the sampling frequency of a maximum of 192 KHz and the number of 24 quantization bits.

It is another object of the present invention to provide a DVD audio disk which is capable of encoding the sampled digital audio signal in a set mode, and recording it up to the number of channels limited by the transmission velocity of the data and the coding mode by using the sampling frequency of a maximum of 192 KHz and a maximum number of 24 quantization bits.

Still another object of the present invention is to provide a device and method for reproducing a DVD audio disk recorded in the linear PCM mode.

Yet another object of the present invention is to provide a device and method for reproducing a DVD audio disk which stores the compressed audio data.

A still further object of the present invention is to provide a device and method for discriminating a DVD video or audio disk, and reproducing it according to the discrimination result.

To accomplish the above and other objects of the present invention, there is provided a DVD video/audio disk having information areas each storing an audio title information management table, and respective data areas each storing audio packs of a linear PCM mode, wherein a first, second or third number of quantization bits, a corresponding first, second or third sampling frequency, and information relative to the number of audio channels are all recorded on the audio title information management table, each audio pack being provided with audio packets made up of the corresponding number of quantization bits, the corresponding sampling frequency and the information relative to the number of channels all recorded on the audio title management table, the packets further containing audio data.

The above objects may further be accomplished by providing a DVD audio disk reproducing device including a data receiver for receiving audio data reproduced from the disk; a controller for analyzing the audio data reproduced from the disk to thereby generate an audio control signal containing an audio coding mode, sampling frequency, number of channel and quantization information; an audio decoder having a plurality of decoders, one of the plurality of decoders decoding the audio data received after being selected according to the audio coding mode of the audio data, including multi-channel mixing, sampling frequency converting and requantizing the decoded audio data, according to the audio control signal; and an audio output for converting the audio data decoded into an analog audio signal.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIGS. 3A and 3B show the configurations of the multi-channel audio stream attribute of VTS in the conventional DVD video disk;

FIGS. 13A and 13B show the configurations of the multi-channel audio stream attribute tables in the DVD audio disk according to the embodiment of the present invention;

DESCRIPTION OF THE PREFERRED EMBODIMENTS

The present invention discloses a DVD audio disk and a device and method for reproducing it. According to the VTSI_MAT of the DVD audio disk of the present invention, the audio information is changed in the VTSI_MAT from the DVD video disk shown in tables 1a through 2b. With the DVD audio disk of the present invention, VTSM_AST_ATR of RBP 260–267, VTS_AST_ATRT of RBP 516–579, and the information of the reserved area of RBP 984–2047 are changed in the VTSI_MAT shown in tables 1a through 2b.

The audio coding mode of VTSM_AST_ATR and VTS_AST_ATRT stores the coding information of the audio data recorded on the disk. In the preferred embodiment of the present invention, there is presented an example of recording audio data on the DVD audio disk in the linear PCM mode or pseudo-lossless psychoacoustic coding mode. In this embodiment, it is assumed that the psychoacoustic coding mode uses the DTS coding mode. Here, the DTS coding mode can be used optionally. If b63-b61 is "110b", this is the DTS audio coding mode.

Figure 1:
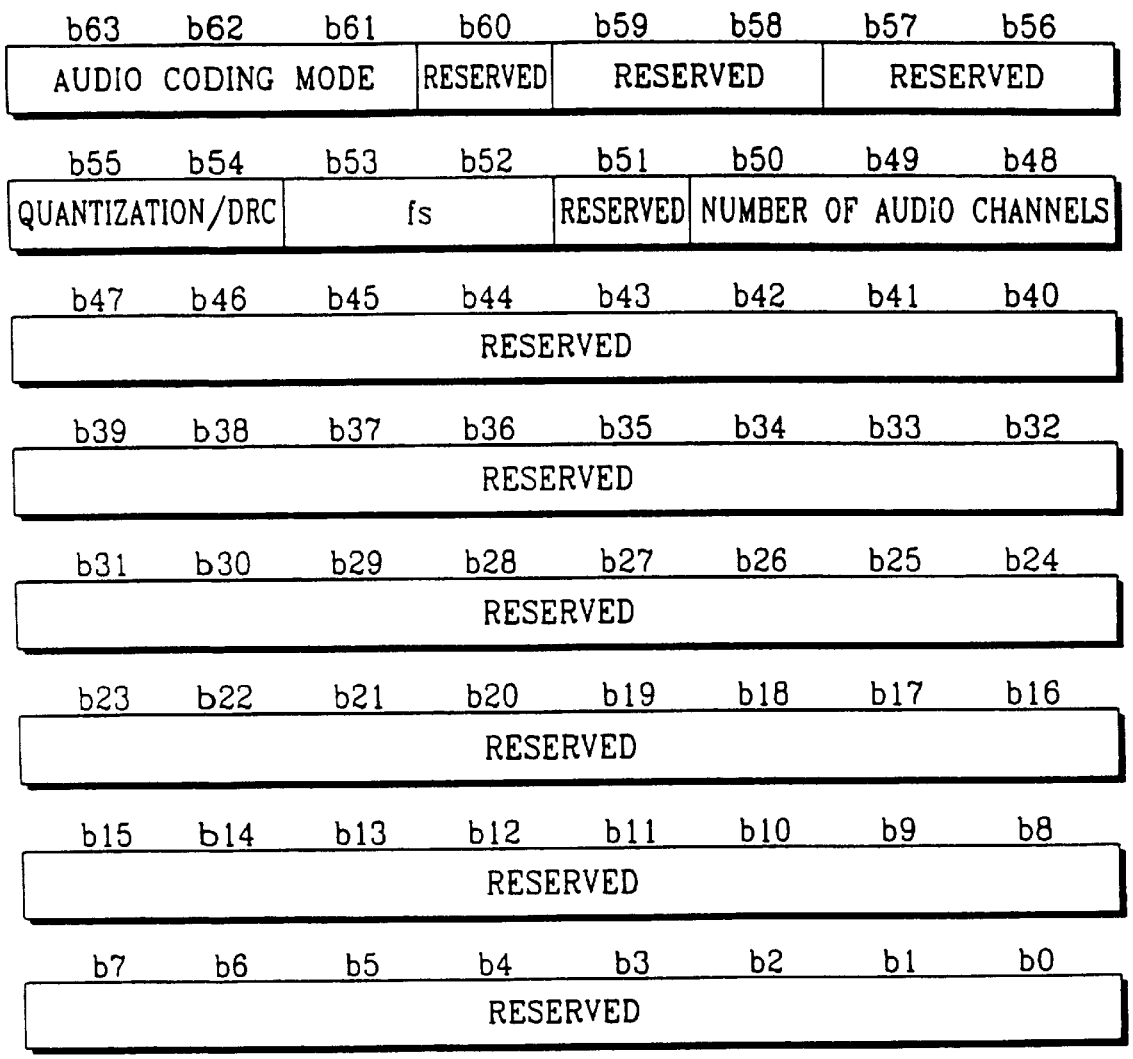
FIG. 1 shows the structure of an audio stream attribute of VTSM in a conventional DVD video disk.
Figure 2:
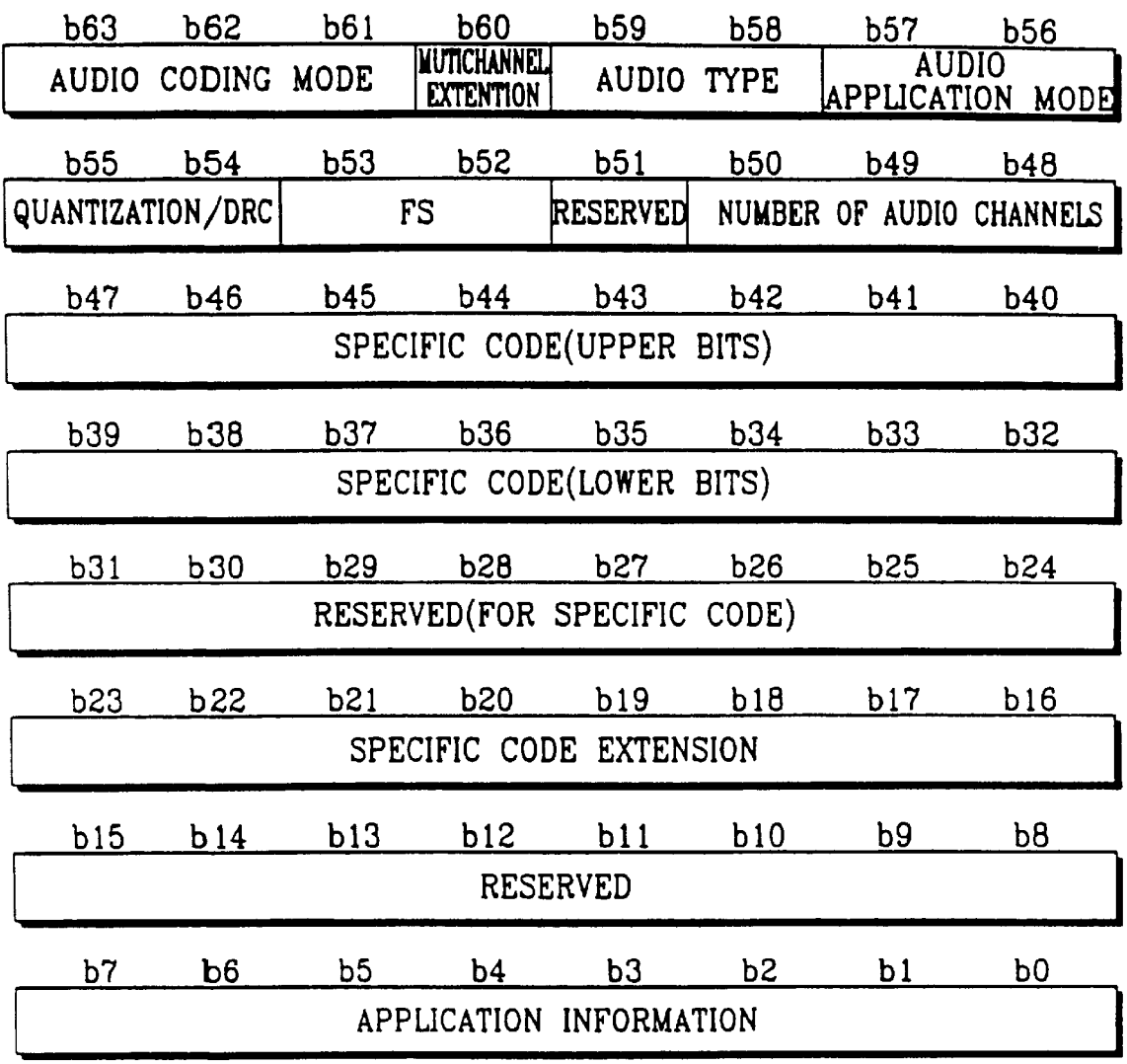
FIG. 2 shows the structure of an audio stream attribute table of VTS in the conventional DVD video disk.
Figure 4:
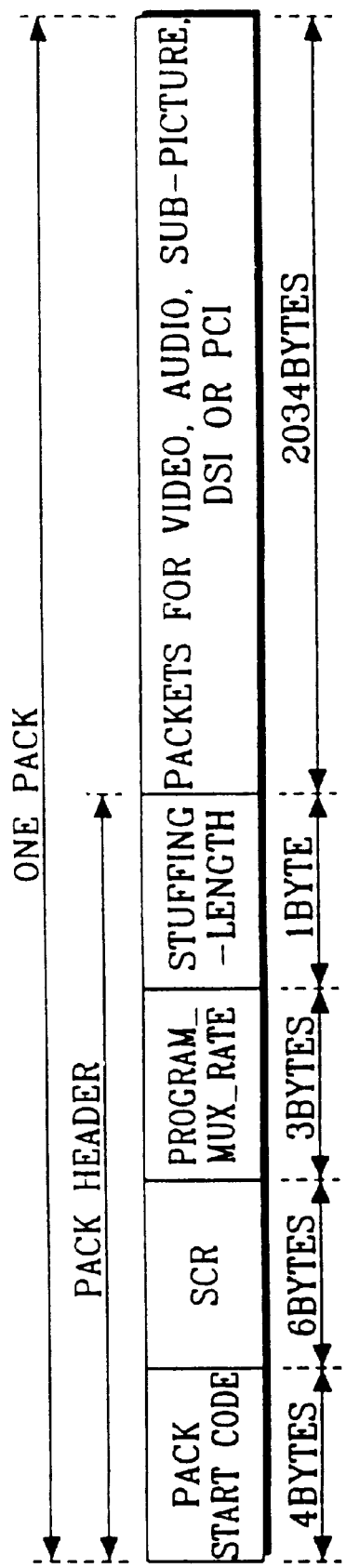
FIG. 4 shows the structure of an audio pack having no padding packet in the conventional DVD video disk.
Figure 11:
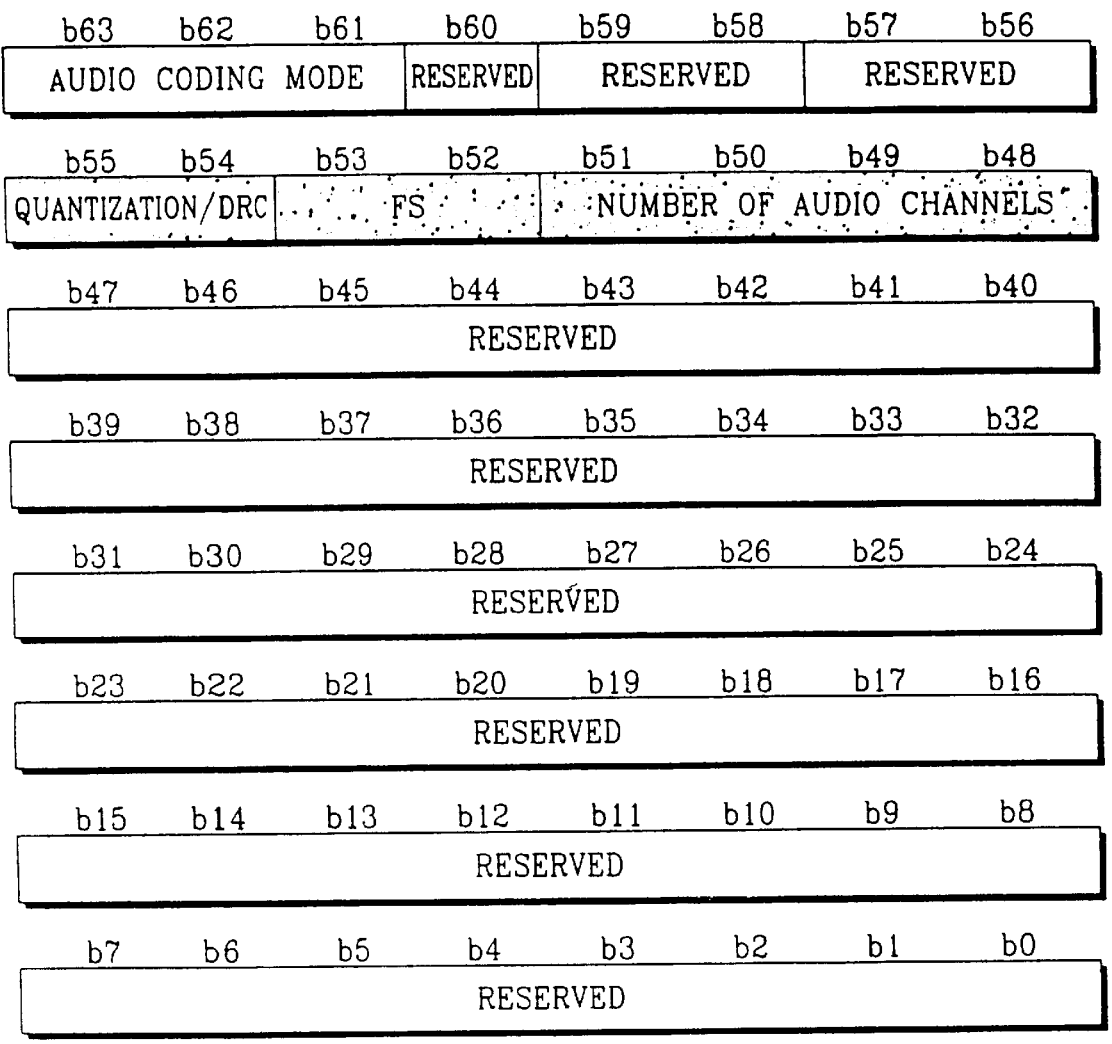
FIG. 11 shows the structure of the audio stream attribute of VTSM in a DVD audio disk according to an embodiment of the present invention.

Explaining the change of VTSM_AST_ATR, the data pattern and definition of b55-b48 are changed, as shown in FIG. 11. In b55-b48 of VTSM_AST_ATR shown in FIG. 2, the reserved bit of b51 is absorbed to the audio channel bits which represent the number of audio channels.

According to the definition changed in FIG. 11, the audio sampling frequency fs is changed as shown in table 17.

TABLE 17

| b53-b52 | fs |
|---|---|
| 00b | 48 KHz |
| 01b | 96 KHz |
| 10b | 192 KHz |
| 11b | Reserved |

The number of audio channels is changed as in tables 18a and 18b.

TABLE 18a

| b51-b48 | Number of Audio Channels |
|---|---|
| 0000b | 1ch (mono) |
| 0001b | 2ch (stereo) |
| 0010b | 3ch (multichannel) |
| 0011b | 4ch (multichannel) |
| 0100b | 5ch (multichannel) |

TABLE 18b

| 0101b | 6ch (multichannel) |
|---|---|
| 0110b | 7ch (multichannel) |
| 0111b | 8ch (multichannel) |
| 1000b | 9ch (multichannel) |
| 1001b | 10ch (multichannel) |
| 1010b | 11ch (multichannel) |
| 1011b | 12ch (multichannel) |
| 1100b | 13ch (multichannel) |
| 1101b | 14ch (multichannel) |
| 1110b | 15ch (multichannel) |
| 1111b | 16ch (multichannel) |

Figure 12:
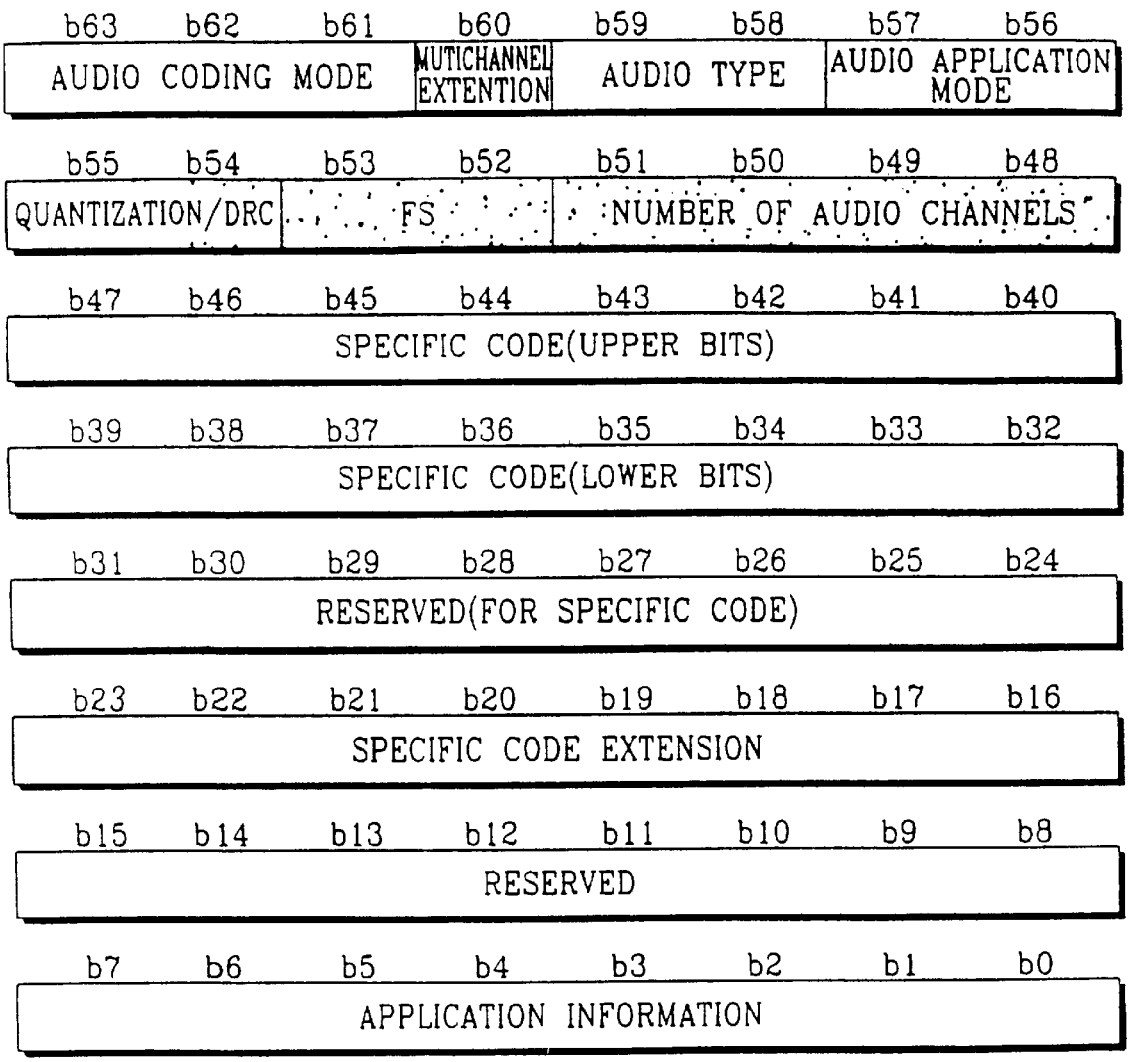
FIG. 12 shows the structure of the audio stream attribute table of VTS in the DVD audio disk according to the embodiment of the present invention.

With VTS_AST_ATRT, the data pattern and definition of b55-b48 are changed as in FIG. 12. In VTS_AST_ATRT of FIG. 2, the reserved bit of b51 is absorbed to the number of audio channels. According to the definition changed in FIG. 11, the audio sampling frequency fs is changed as in table 17, and the number of audio channels is changed as in tables 18a and 18b.

To VTS_MU_AST_ATR, the information shown in FIGS. 13A and 13B is added. The VTS_MU_AST_ATR offers information to the linear PCM audio only to eight channels but not thereabove. Therefore, if the linear PCM data is written, a maximum of 13 channels are available so that information from the ninth channel to the thirteenth channel is written in the reserved area after VTS_MU_AST_ATR. VTS_MU_AST_ATR_EXT includes VTS_MU_AST_EXT (1) shown in FIG. 13A and VTS_MU_AST_ATR EXT (2) shown in FIG. 13B, like VTS_MU_AST_ATR.

The format of the DVD audio disk having the VTSI_MAT changed as above is divided into the linear PCM area and pseudo-lossless psychoacoustic coded data.

First of all, in the DVD audio disk of the linear PCM area, data is recorded in the linear PCM mode. The sampling frequency may be 48, 96, or 192 KHz for any item of audio data. The number of quantization bits may be 16, 20, or 24 bits. Audio data of one, two or all three of the sampling frequencies and number(s) of quantization bits may be recorded on the disk. The number of recording channels for each item of audio data is from one to the maximum number the bit rate permits. The number of recording channels is determined with the following equation 1.

Equation 1, $$N = \frac{Mbr}{Fs * Qb}$$

Fs: sampling frequency (Hz); 48, 96, or 192 KHz
Qb: number of quantization bits; 16, 20, or 24 bits
Mbr: maximum data transmission rate (Mbps) of DVD disk; 10.08 Mbps
N: maximum number of channels recordable as determined by the data transmission rate, sampling frequency, and the number of quantization bits of the audio data recorded on the DVD disk.

The number of channels determined by equation 1 is shown in table 19.

TABLE 19

| Sampling Frequency | Number of Quantization Bits | Maximum Number of Channels |
| --- | --- | --- |
| 48 KHz | 16 bit | 13 channel |
| 48 KHz | 20 bit | 10 channel |
| 48 KHz | 24 bit | 8 channel |
| 96 KHz | 16 bit | 6 channel |
| 96 KHz | 20 bit | 5 channel |
| 96 KHz | 24 bit | 4 channel |
| 192 KHz | 16 bit | 3 channel |
| 192 KHz | 20 bit | 2 channel |
| 192 KHz | 24 bit | 2 channel |

Figure 5A:
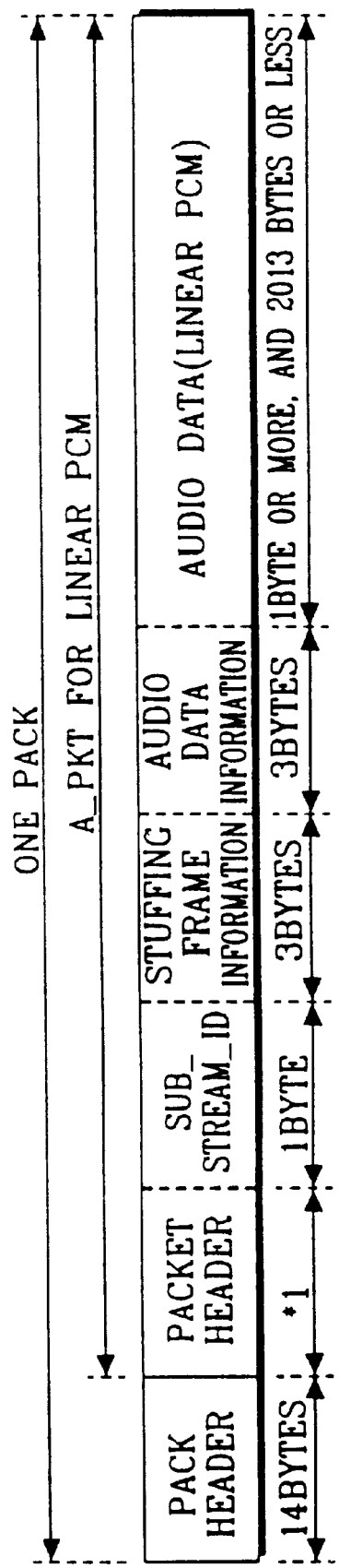
FIGS. 5A–5E show the structures of the audio pack shown in FIG. 4 in the conventional DVD video disk.

The data structure of the DVD audio disk of the present invention is based on the MPEG2 system layer. In case of the linear PCM of the present invention, the audio pack is made as in FIG. 14. The linear PCM audio pack shown in FIG. 14 has the same structure as that in FIG. 5A. The audio pack has 14 bytes of pack header and a maximum of 2021 bytes of linear PCM packet. The pack header of FIG. 14 conforms to the standards of the MPEG2 system layer.

The structure of the linear PCM audio packet is based on the standards of the MPEG2 system layer. The audio packet of the linear PCM has the structure shown in tables 10a and 10b and table 20.

TABLE 20

| Field | Number of bits | Number of Bytes | Value | Comments |
| --- | --- | --- | --- | --- |
| sub_steam_id | 8 | 1 | 10100***b | Note 1 |
| number_of_frame_headers | 8 | 3 | Provider defined | Note 2 |
| first_access_unit_pointer | 16 | | provider defined | Note 3 |
| audio_emphasis_flag | 1 | 3 | provided defined | Note 4 |
| audio_mute_flag | 1 | | provider defined | Note 5 |
| reserved | 1 | | 0 | 0 |
| audio_frame_number | 5 | | Provider defined | Note 6 |
| quantization_word_length | 2 | | Provider defined | Note 7 |
| audio_sampling_frequency | 2 | | Provider defined | Note 8 |
| number_of_audio_channels | 4 | | Provider defined | Note 9 |
| dynamic_range_control | 8 | | Provider defined | Note 10 |
| Audio data area (Linear PCM) | | | | |

In table 20, Note 1–Note 10 are as follows.
Note 1: ***inidcates the decoding audio data stream number.
Note 2: "number_of_frame_headers" indicates the number of audio frames containing the first byte within the corresponding audio packet.
Note 3: The access unit is an audio frame. The first_access_unit inidicates the first audio frame containing the first byte within the corresponding audio packet.
Note 4: "audio_emphasis_flag" indicates the state of emphasis. If the audio sampling frequency is 96, 192 KHz, this should be represented as "emphasis off". The emphasis is applied from the sample of the first access unit.
0b: emphasis off
1b: emphasis on
Note 5: "audio mute flag" indicates the state of mute if all the data of the audio frame is zero. Mute is applied from the first sample of the first access unit.
0b: mute off
1b: mute on
Note 6: "audio frame number" is the number of ground of audio frame GOF of the first access unit of the audio packet. This number covers from 0 to 19.
Note 7: "quantization_word_length" is the number of bits used in the quantization of an audio sample.
00b: 16 bits
01b: 20 bits
10b: 24 bits
11b: reserved

TABLE 20-continued

| Field | Number of bits | Number of Bytes | Value | Comments |
|---|---|---|---|---|

Note 8: "audio_sampling_frequency" is the dampleing frequency used in the sampling of the
audio sample.
00b: 48 KHz
01b: 96 KHz
10b: 192 Khz
11b: reserved
Note 9: "number_of_channels" indicates the number of audio channels.
0000b: 1ch (mono)
0001b: 2ch (stereo)
0010b: 3ch (multi-channel)
0011b: 4ch (multi-channel)
0100b: 5ch (multi-channel)
0101b: 6ch (multi-channel)
0110b: 7ch (multi-channel)
0111b: 8ch (multi-channel)
1000b: 9ch (multi-channel)
1001b: 10ch (multi-channel)
1010b: 11ch (multi-channel)
1011b: 12ch (multi-channel)
1100b: 13ch (multi-channel)
Note 10: "dynamic range control" indicates the dynamic range control word for compressing
the dynamic range from the first access unit.
The structure of the linear PCM audio packet and the corresponding frame length are shown in
tables 21a and 21b.

TABLE 21a

| Stream Mode | | | Data in a packet | | | |
|---|---|---|---|---|---|---|
| Number of Channels | ks(KHz) | Quantization (bits) | Maximum number of samples in a packet | Date size (byte) | Packet stuffing of first/other PES packet (byte) | Padding packet for first/other PES packet (byte) |
| 1(mono) | 48/96/192 | 16 | 1004 | 2008 | 2/5 | 0/0 |
| | 48/96/192 | 20 | 804 | 2010 | 0/3 | 0/0 |
| | 48/96/192 | 24 | 670 | 2010 | 0/3 | 0/0 |
| 2(stereo) | 48/96/192 | 16 | 502 | 2008 | 2/5 | 0/0 |
| | 48/96/192 | 20 | 402 | 2010 | 0/5 | 0/0 |
| | 48/96/192 | 24 | 334 | 2004 | 6/0 | 0/9 |
| 3 | 48/96/192 | 16 | 334 | 2004 | 6/0 | 0/9 |
| | 48/96 | 20 | 268 | 2010 | 0/3 | 0/0 |
| | 48/96 | 24 | 222 | 1988 | 0/0 | 12/15 |
| 4 | 48/96 | 16 | 250 | 2000 | 0/0 | 10/13 |
| | 48/96 | 20 | 200 | 2000 | 0/0 | 10/13 |
| | 48/96 | 24 | 166 | 1992 | 0/0 | 18/21 |

TABLE 21b

| | | | | | | |
|---|---|---|---|---|---|---|
| 5 | 48/96 | 16 | 200 | 2000 | 0/0 | 10/13 |
| | 48/96 | 20 | 160 | 2000 | 0/0 | 10/13 |
| | 48 | 24 | 134 | 2010 | 0/3 | 0/0 |
| 6 | 48/96 | 16 | 166 | 1992 | 0/0 | 18/21 |
| | 48 | 20 | 134 | 2010 | 0/3 | 0/0 |
| | 48 | 24 | 110 | 1980 | 0/0 | 30/33 |
| 7 | 48 | 16 | 142 | 1988 | 0/0 | 22/25 |
| | 48 | 20 | 114 | 1995 | 0/0 | 15/18 |
| | 48 | 24 | 94 | 1974 | 0/0 | 36/39 |
| 8 | 48 | 16 | 124 | 1984 | 0/0 | 26/29 |
| | 48 | 20 | 100 | 2000 | 0/0 | 10/13 |
| | 48 | 24 | 82 | 1968 | 0/0 | 42/45 |
| 9 | 48 | 16 | 110 | 1968 | 0/0 | 30/33 |
| | 48 | 20 | 88 | 1980 | 0/0 | 30/33 |
| 10 | 48 | 16 | 100 | 2000 | 0/0 | 10/13 |
| | 48 | 20 | 80 | 2000 | 0/0 | 10/13 |
| 11 | 48 | 16 | 90 | 1980 | 0/0 | 30/33 |
| 12 | 48 | 16 | 82 | 1968 | 0/0 | 42/45 |
| 13 | 48 | 16 | 76 | 1976 | 0/0 | 34/37 |

If the number of samples is smaller than that in tables 21a and 21b, the length of the padding packet is increased to fit the length of the pack. The samples coincide with the packet boundary. In other words, all the audio packets start from the first byte of $S_{2n}$. The number of the audio samples is always even within one packet.

From now on, the DVD audio disk that records the psychoacoustic coded audio data will be described.

In case of recording the audio data of linear PCM and if a sampling frequency of 48 KHz and 16 quantization bits are used as in table 19, 13 channels are available so that the audio data can be written in up to 10 channels that are required for multi-channel music. However, in the case of a sampling frequency of 192 KHz and 24 quantization bits, a maximum of two channels of audio data are written as in table 19, which cannot meet the requirement of multi-channel audio. If sampling is performed by using many bits at a high sampling frequency, it is difficult to implement the function of multi-channel audio. For this, lossless coding or pseudo-lossless psychoacoustic coding is used. But, it is hard to expect much effect in implementation of multi-channel because the compression rate of the lossless coding is 2:1 in most cases.

In this embodiment, it is assumed that the pseudo-lossless psychoacoustic coding method uses a DTS coding mode which has a compression rate of 4:1. The DTS coding mode is able to contain a sufficient number of channels without any deterioration of sound quality. For instance, DTS enables coding for a high specification of 192 KHz and 24 bits, unlike other currently presented coding algorithms, and minimizes the deterioration of sound quality rather than the reduction of bit rate. The sampling frequency is 48, 96, or 192 KHz, the number of quantization bit is 16, 20, or 24 bits, and the number of recording channels is from one to the maximum number that is allowed by the coding mode and bit rate. The number of recording channels can be determined by the following equation 2.

Equation 2, $$N = \frac{Mbr * Ccr}{Fs * Qb}$$

Fs: sampling frequency (Hz); 48 KHz, 96 KHz, or 192 KHz

Qb: number of quantization bits; 16 bits, 20 bits, or 24 bits

Mbr: maximum data transmission rate (10.08 Mbps) of the DVD disk

Ccr: compression ratio in accordance with a compressive coding mode

N: maximum number of channels recordable as determined by the data transmission rate, sampling frequency, and the number of quantization bits, and a compression ratio of the DVD disk. Here, the coding mode is assumed to use the DTS having a 4:1 compression rate. In this case the number of channels determined by equation 2 is shown in table 22.

TABLE 22

| Sampling Frequency | Number of Quantization Bits | Maximum Number of Channels |
|---|---|---|
| 48 KHz | 16 bit | 52 channel |
| 48 KHz | 20 bit | 42 channel |
| 48 KHz | 24 bit | 35 channel |
| 96 KHz | 16 bit | 26 channel |
| 96 KHz | 20 bit | 21 channel |
| 96 KHz | 24 bit | 17 channel |
| 192 KHz | 16 bit | 13 channel |
| 192 KHz | 20 bit | 10 channel |
| 192 KHz | 24 bit | 8 channel |

Figure 14:
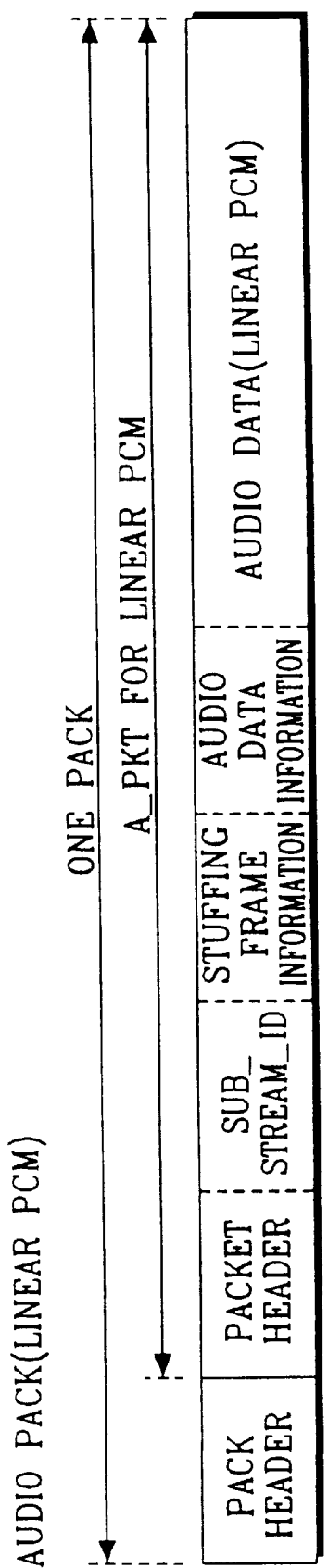
FIG. 14 shows the structure of the audio pack of the linear PCM audio data in the DVD audio disk according to the embodiment of the present invention.
Figure 15:
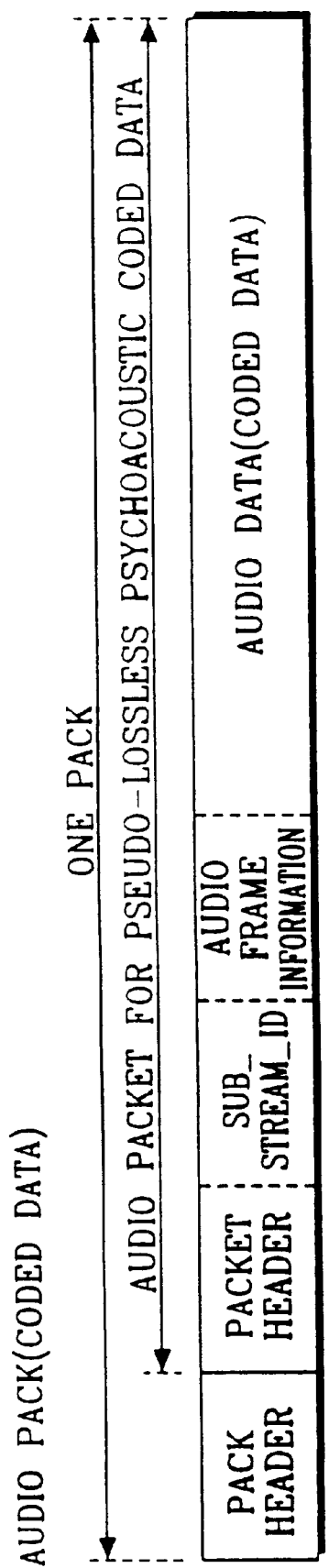
FIG. 15 shows the structure of the audio pack of the coded audio data in the DVD audio disk according to the embodiment of the present invention.

As stated above, the structure of the DVD audio disk of the present invention is based upon the MPEG2 system layer, and therefore the compressed audio pack is made as in FIG. 15. The compressed audio pack is made to have 14 bytes of pack header and a maximum of 2021 bytes of compressed audio packet data. In FIG. 14, the pack header conforms to the standards of the MPEG2 system layer.

The structure of the compressed audio packet is also based upon the standards of the MPEG2 system layer. The coded audio packet is structured as in tables 10a and 10b and 23.

TABLE 23

| Field | Number of bits | Number of Bytes | Value | Comment |
|---|---|---|---|---|
| sub_stream_id | 8 | 1 | &&&& &***b | Note 1 |
| number_of_frame_headers | 8 | 1 | Provider defined | Note 2 |
| first_access_unit_pointer | 16 | 2 | Provider defined | Note 3 |
| DTS audio data area | | | | |

In the above table 23, Note 1–Note 3 are as follows.
Note 1: "sub_stream id" is different according to the coding mode. If the coding mode is DTS, it becomes "1000 1*b". In the sub_stream_id, * is the number of the decoding audio stream.
Note 2: "number_of_frame_headers" indicates the number of the audio frame containing the first byte within the corresponding audio packet.
Note 3: The access unit is audio frame. First_access_unit indicates the first audio frame containing the first byte within the corresponding audio packet.

The DVD audio disk of the compressive coding mode has the following specifications. The number of channels enabling compression is over eight channels. The sampling frequency is 48,: 96 or 192 KHz. The number of quantization bits is 16, 20, or 24 bits. The compression rate is available from 1:1 to 5:1. Down mixing, dynamic range control, and time stamp are enabled. Finally, the excellency of sound quality is actually recognized.

A device for reproducing the DVD audio disk can be formed independently, or it can be connected to the DVD video reproducing device. In this embodiment, the DVD audio disk reproducing device is first explained, and then the reproducing device to which the DVD audio disk reproducing device is added.

Figure 16:
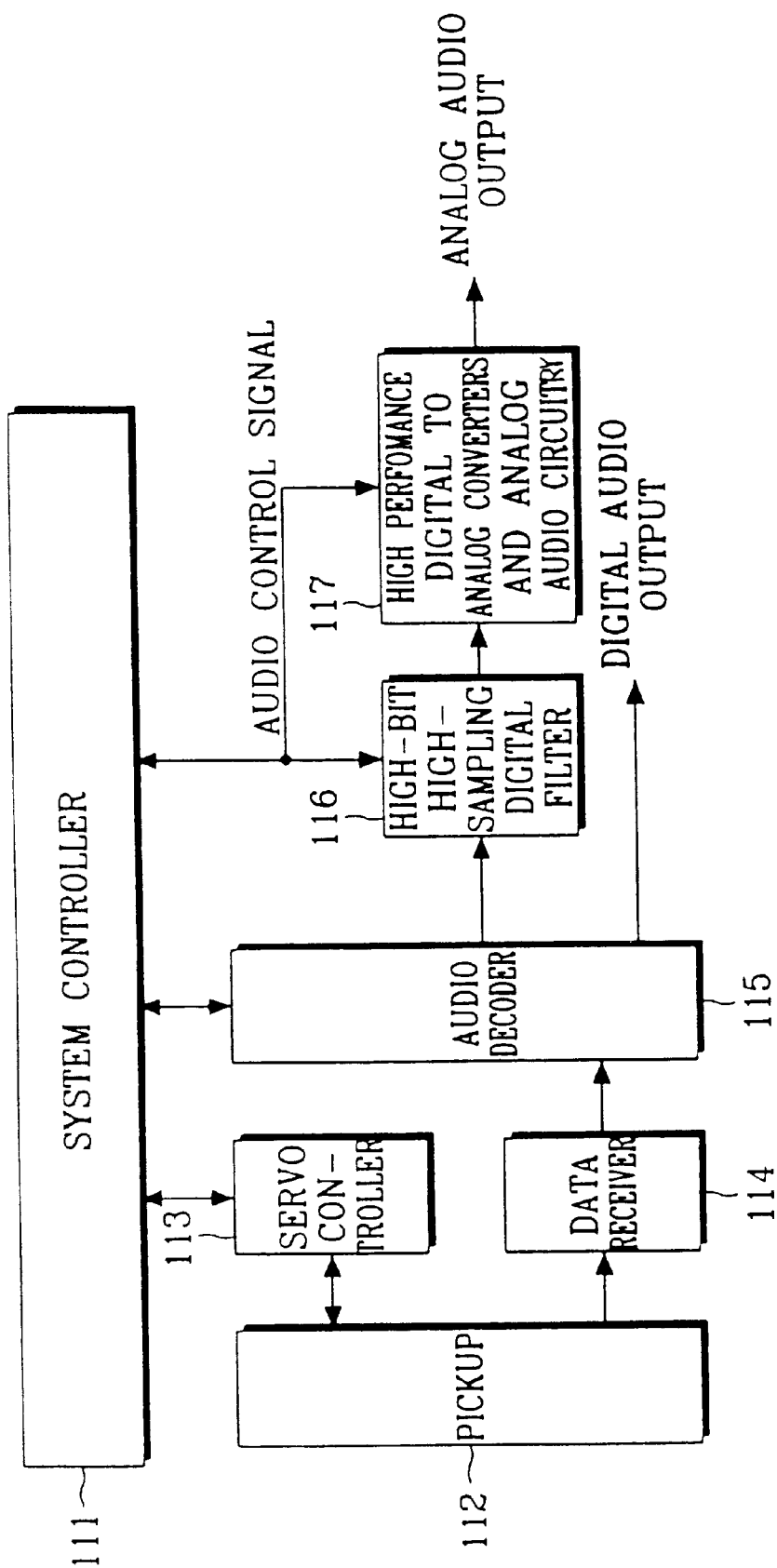
FIG. 16 shows the configuration of a first type of device for reproducing the DVD audio disk according to the embodiment of the present invention.

The DVD audio disk reproducing device is shown in FIG. 16. System controller 111 controls the overall operation of the DVD audio disk reproducing device, interfacing with the user. System controller 111 analyzes the VTSI_MAT, audio packs and packet headers recorded on the DVD audio disk, in order to perform the overall operation of reproducing the audio signal. Pickup 112 performs the function of reading the data recorded on the DVD audio disk. Servo controller 113 controls the driving of pickup 112 under the control of the system controller 111, performing various servo functions. Data receiver 114 performs the error analysis and correction of the audio data output from pickup 112. Data receiver 114 contains an error correction circuit (ECC). Audio decoder 115 sends control information for the audio information output from the data receiver 114 to the system controller 111, and decodes the audio data received under the control of the system controller 111.

Audio decoder 115 has a configuration of decoding the linear PCM audio data and compressed audio data in order to decode the audio data in accordance with the embodiment of the present invention. This configuration is shown in FIG. 17.

Figure 17:
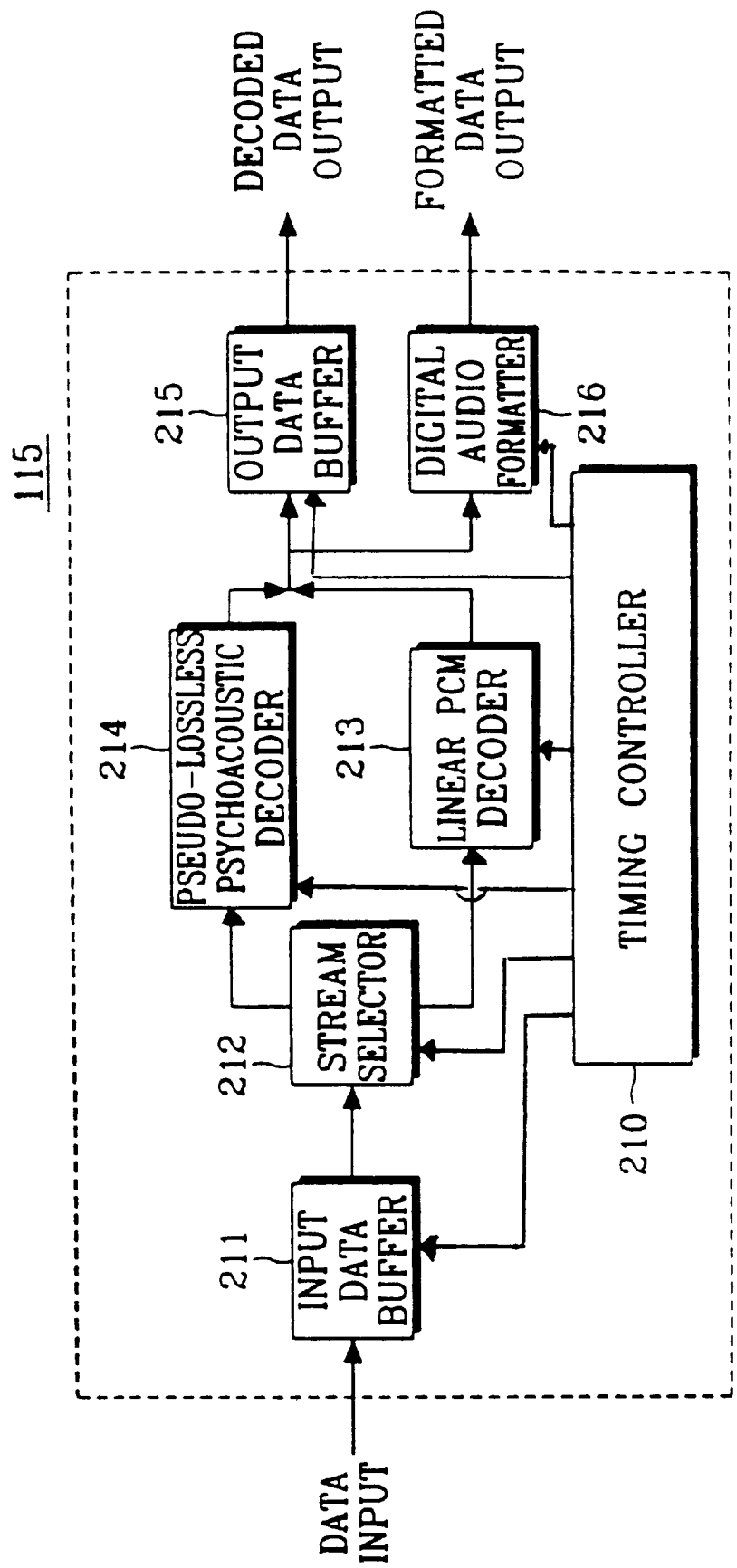
FIG. 17 shows the configuration of the audio decoder shown in FIG. 16.

Referring to FIG. 17, an input data buffer 211 receives and stores the audio data output from the data receiver 114. Stream selector 212 selectively outputs the audio data stream output from the input data buffer 211 under the control of the system controller 111. Linear PCM decoder 213 receives the linear audio data output from the stream selector 212, and decodes and outputs it as the original audio data. Pseudo-lossless psychoacoustic decoder 214 receives the compressed data output from the stream selector 212, and decodes and outputs it as the original audio data. Output data buffer 215 stores and outputs the audio data output from decoders 213 and 214. Digital audio formatter 216 changes the audio data output from the decoders 213 and 214 to the format designated by the system controller 111. Timing controller 210 controls the system controller 111 so as to generate timing control signals for controlling the operation of the respective components of the audio decoder 115.

High-bit high-sampling digital filter 116 receives the audio data output from the audio decoder 115, and digitally filters the audio data according to the control signal of system controller 111. High-performance digital to analog converters and analog audio circuitry 117 converts the audio data output from high-bit high-sampling digital filter 116 into an analog signal.

Referring to FIGS. 16 and 17, the data receiver 114 sends the audio data reproduced from the DVD audio disk to the audio decoder 115 via the pickup 112. The audio data reproduced is stored sequentially to the input data buffer 211 of the audio decoder 115. The stream selector 212 selectively outputs the data stored in the input data buffer 211 to the corresponding decoder 213 or 214. When the system controller 111 requests audio data decoding of linear PCM, stream selector 212 transmits the audio data stored in input data buffer 211 to linear PCM decoder 213. If the system controller 111 requests the decoding of the compressed data, the stream selector 212 transmits the audio data stored in the input data buffer 211 to the decoder 214.

Explaining the decoding of the linear PCM audio data, the linear PCM decoder 213 performs multi-channel down mixing, sampling frequency conversion, and requantization of the input signal. For instance, if the data output from the stream selector 212 is 8-channel data, and it is required to be converted to two-channel data in its output, the linear PCM decoder 213 makes a desired number of channels by performing multi-channel down mixing. If the input data is sampled at 192 KHz and the system controller 111 requires the output of sampling data of 96 KHz, the linear PCM decoder 213 performs the sampling frequency conversion, and converts it to audio data having a required sampling frequency. If the audio data input is 24-bit quantization data and the system controller 111 requires 16-bit quantization data output, the linear PCM decoder 213 performs requantization, and thus generates a desired number of bits of output audio data.

Explaining the decoding of the compressed audio data, decoder 214 decodes the compressed audio data by using the corresponding algorithm under the control of the system controller 111. Here, the form of audio data output from the decoder 214 is designated by the system controller 111. In the embodiment of the present invention, the decoder 214 can become the DTS decoder. The decoder 214 performs multi-channel down mixing, sampling frequency conversion, and requantization of input signal, as well as the decoding of a designated algorithm.

The audio data decoded and output from decoders 213 and 214 are transmitted to the output data buffer 215 and the digital audio formatter 216. Then, the output data buffer 215 stores the input decoded audio data, and outputs it in sync with the control signal output from the timing controller 210. Digital audio formatter 216 formats the decoded audio data in accordance with the transmission format between the digital appliances, and then outputs the formatted data in sync with the control signal output from the timing controller 210. Here, the audio data externally output can be output to an audio/video device or computer having the same transmission format.

The decoded audio data output from the audio decoder 115 is digitally filtered by the high-bit high-sampling digital filter 116 and then output, and the high-performance digital to analog converters and analog audio circuitry 117 converts the audio data output from the high-bit high-sampling digital filter 116. Here, the filter 116 is formed with digital filters, removing noise components other than the audio signal band. In order to process the audio data sampled at 192 KHz and quantized with 24 bits, the high-bit high-sampling digital filter 116 requires a filter coefficient having a resolution and the number of taps far greater than those of the digital filters used in a known DVD or CD. If a D/A converter of 96 or 192 KHz is generally used, the high-bit high-sampling digital filter 116 may be included in the D/A converter. The high-performance digital to analog converters and analog audio circuitry 117 is formed with D/A converters, and converts the audio data whose noise is removed by the high-bit high-sampling digital filter 116 to an analog audio signal.

Figure 18:
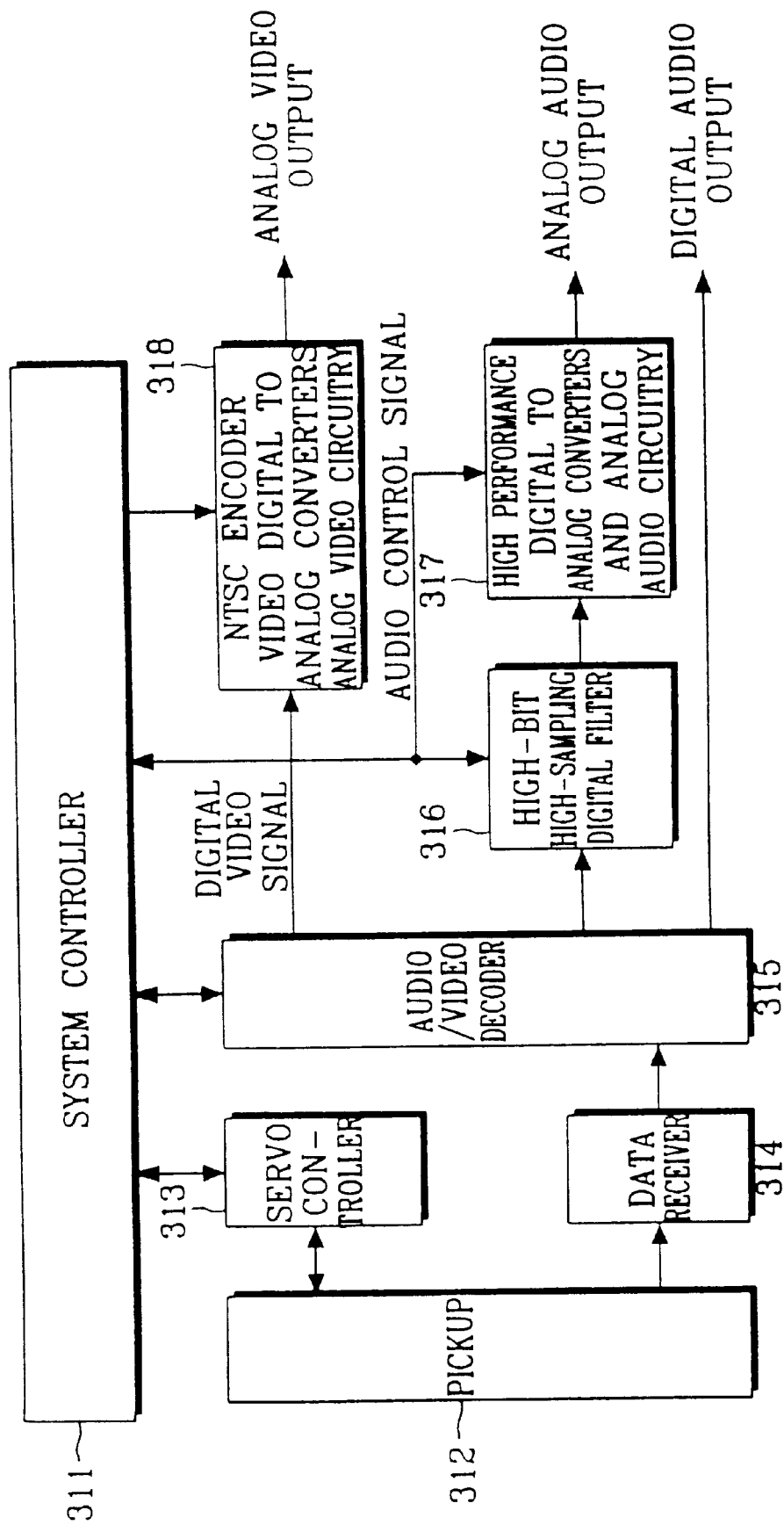
FIG. 18 shows the configuration of a second type of device for reproducing the DVD video disk and the DVD audio disk according to the embodiment of the present invention.

The configuration of the device for reproducing both the DVD video and audio disks is shown in FIG. 18. System controller 311 controls the overall operation of this reproducing device, interfacing with the user. System controller 111 analyzes the VTSI_MAT, audio pack and packet headers recorded on the DVD video disk and DVD audio disk, discriminates the kind of disks, and performs the overall control of the reproduction of the video or audio signal according to the discrimination result. Pickup 312 performs the function of reading the data recorded on the DVD disk. Servo controller 313 controls the driving of the pickup 312 under the control of the system controller 311, performing the various servo functions. Data receiver 314 performs error analysis and correction of the audio data output from pickup 312. Data receiver 314 contains an ECC. Audio/video decoder 315 transmits the information output from the data receiver 314 to the system controller 311, and decodes the audio/video data received, under the control of the system controller 311.

Figure 19:
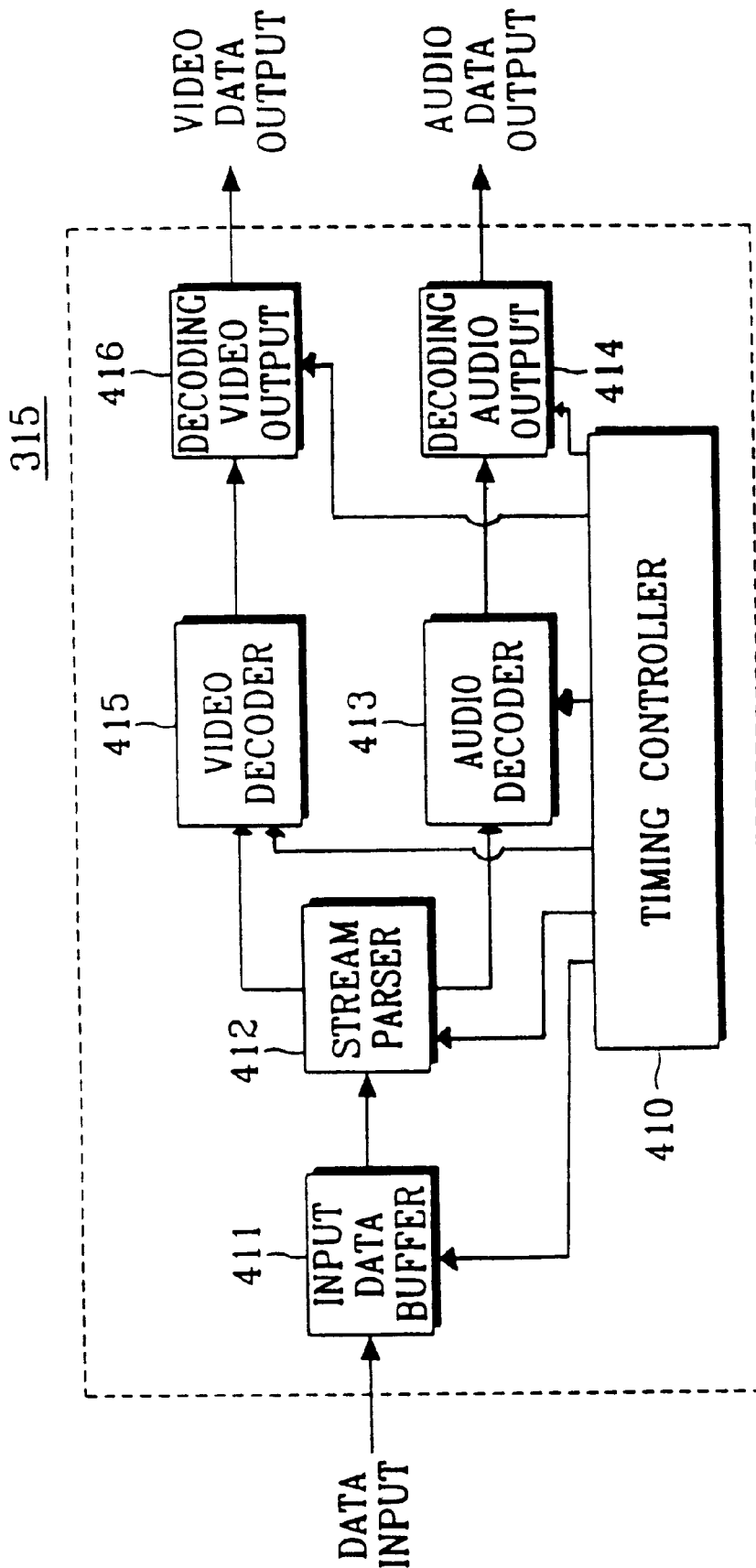
FIG. 19 shows the configuration of the video/audio decoder shown in FIG. 18.

Audio/video decoder 315 has a configuration of decoding the video/audio data, which is shown in FIG. 19. Referring to FIG. 19, input data buffer 411 receives and stores the audio/video data output from the data receiver 314. Stream parser 412 selectively outputs the audio/video data stream output from the input data buffer 411 under the control of system controller 311. Audio decoder 413 receives the audio data selectively output from stream parser 412, and decodes the audio data in a mode selected by the control data output from the system controller 311. Decoding audio output 414 outputs the audio data decoded and output from the audio decoder 413. Video decoder 415 receives the video data selectively output from the stream parser 412, and decodes the video data in a corresponding mode by the control data output from the system controller 311. Decoding video output 416 outputs the video data decoded and output from the video decoder 415. Timing controller 410 generates timing control signals for controlling the operation of the respective components of the audio/video decoder 315.

In FIG. 19, the audio decoder 413 should have decoding devices respectively corresponding to the linear PCM, MPEG, AC-3 and compressive coding modes. Here, the linear PCM and compressive coding modes must further have a configuration for reproducing the audio data recorded in the disk of the present invention. In other words, this invention has decoders for reproducing audio data in accordance with the sampling frequency, quantization bit, and audio channel number of the embodiment, and a stream selector for distributing the audio data corresponding to the respective decoders.

High-bit high-sampling digital filter 316 receives audio data output from audio/video decoder 315, and digitally filters the audio data input, according to the control signal of system controller 311. High performance digital to analog converters and analog audio circuitry 317 performs analog conversion of the audio data output from the high-bit high-sampling digital filter 316. NTSC encoder video digital to analog converter's analog video circuitry 318 NTSC codes the video data output from video decoder 315, and converts it to an analog signal.

Referring to FIGS. 18 and 19, the reproduced data of the disk output from pickup 312 is transmitted to the data receiver 314, and the data receiver 314 error corrects and analyzes the data received, which is then transmitted to the audio/video decoder 315. The data output from data receiver 314 is applied and stored in the input data buffer 411 of the audio/video decoder 315. System parser 412 selects a required stream according to the control data of the system controller 311, analyzes the input data, transmits the video data to the video decoder 415, and transmits the audio data to audio decoder 413.

Audio decoder 413 deforms and outputs the audio data output from the stream parser 412 according to the system controller 311. Audio decoder 413 must include the audio decoding of the DVD video disk and the audio decoding of the DVD audio disk.

Video decoder 415 decodes, deforms and outputs the input video data according to the system controller 311. The video data deformation of video decoder 415 means video signal processing, such as sub_title process or pan_scan.

The decoded audio/video data output from the audio decoder 413 and video decoder 415 are output to the decoding audio output 414 and the decoding video output 416, respectively. Then, outputs 414 and 416 store the decoded data input, and output it in sync with the timing control signal output from timing controller 410. Here, the decoding audio output 414 externally transmits the digital audio data formatted in accordance with the transmission format between the digital appliances. The audio data output from the decoding audio output 414 is transmitted to another audio/video device or computer.

The audio/video decoder 315 of the reproducing device shown in FIG. 18 conforms to the standards of the DVD video in processing the video signal, and processes the algorithm of the present invention and the algorithm in accordance with the standards of the DVD video in processing an audio signal. Audio decoder 413 contains the linear PCM and DTS algorithm among the audio standards in the DVD video disk so that playback must be enabled even in the case the DVD video disk is inserted or in case that the DVD audio disk of the present invention is inserted.

Here, the audio algorithm required in decoding of the DVD video disk is linear PCM decoding (1)+AC-3 decoding+MPEG decoding. The audio algorithm required in decoding of the DVD audio disk of the present invention is linear PCM decoding (2)+pseudo-loss less psychoacoustic decoding. Therefore, the linear PCM algorithm of the DVD video disk is contained in the linear PCM algorithm of the present invention. The audio data decoding algorithm used in the DVD video/audio disk reproducing device must contain the functions of the equation 3, and is performed in the audio decoder 413.

Equation 3,

Audio decoder=linear PCM decoder (2)+pseudo-lossless psychoacoustic decoder+AC-3 decoder+MPEG decoder The reproducing device having the configuration of FIG. 16 or 18 analyzes the information of VTSI_MAT stored in one of the information areas of the disk, to thereby reproduce the audio of the title corresponding to the VTSI_MAT. In this embodiment of the present invention the DVD-audio disk is assumed.

Figure 20:
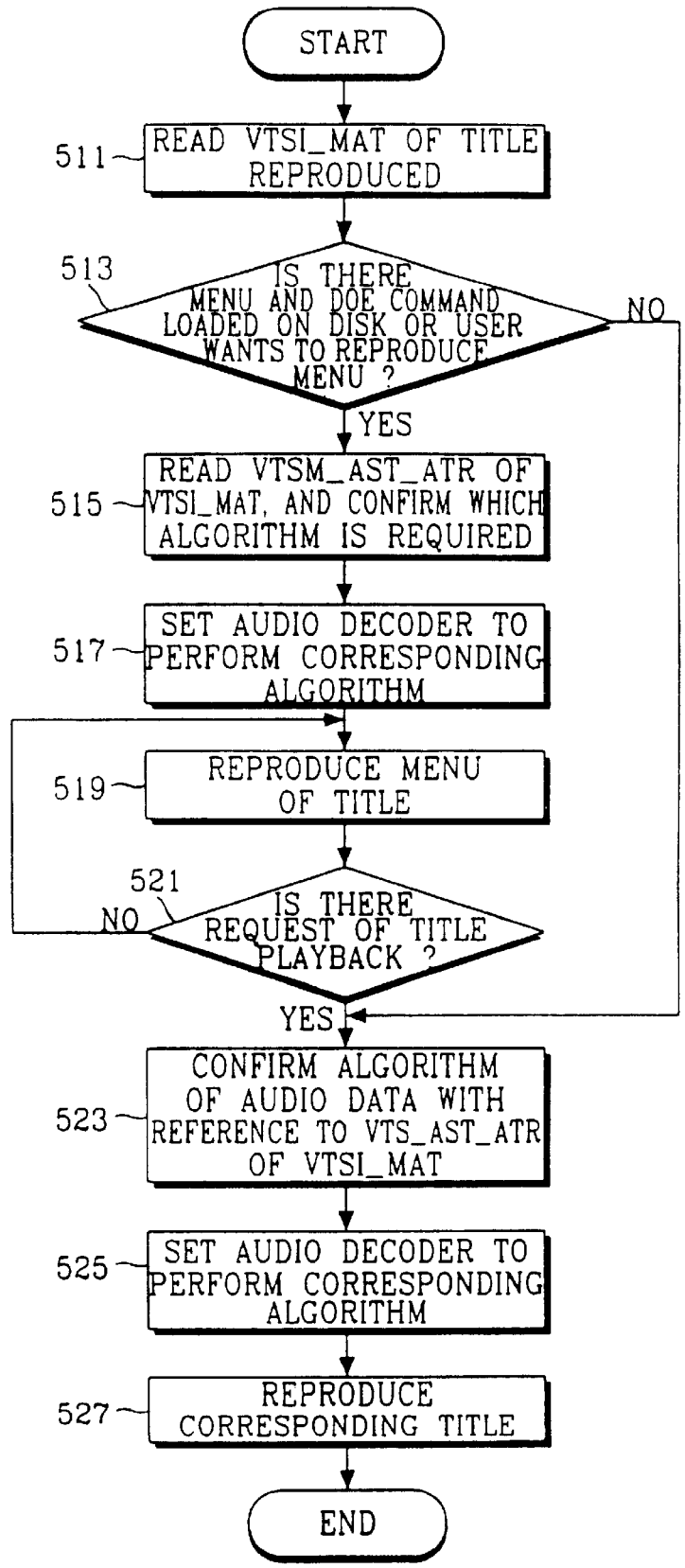
FIG. 20 is a flow chart of confirming the control information of the recorded audio data by analyzing the title set information management table recorded in one of the information areas of the DVD audio disk according to the present invention.

FIG. 20 shows the flow chart of analyzing and setting the information of VTSI_MAT in the system controller 111. Referring to FIG. 20, the system controller 111 reads out VTSI_MAT of a title intended to be reproduced like tables 1a and 1b and 2 in the corresponding information area of the disk. System controller 111 analyzes VTSI_MAT read in step 513, and checks whether there is a menu, and a command loaded in the disk or the user requires playback.

If the menu is required to be played back (the call for the menu ocurring in response to a specific command), system controller 111 reads VTSM_AST_ATR shown in FIG. 11 from the information of VTSI_MAT, and confirms an algorithm necessary in step 515. System controller 111 reads out the audio coding mode of VTSM_AST_ART, confirms the corresponding audio coding mode, and sets the audio decoder 115 in order to perform the algorithm of the corresponding audio coding mode in step 517. Here, the functions that must be set in audio decoder 115 are quantization/DRC information, sampling frequency fs, and audio channel number. After setting audio decoder 115, system controller 111 reproduces the menu of the corresponding title while performing steps 519 and 521. Such a procedure is a process that reproduces the menu of the title.

If the playback of menu is not required in step 513 or the playback of menu of the title is finished in step 521, system controller 111 progresses to step 523 so as to confirm the information of VTS_AST_ATR shown in FIG. 12 from the information of VTSI_MAT. Here, the system controller 111 confirms the audio coding mode of VTS_AST_ATR shown in FIG. 12, and thus the algorithm of the corresponding audio data. System controller 111 confirms the quantization information, sampling frequency and channel number of VTS_AST_ATR in step 525, to thereby set the audio decoder 115. In step 527, the audio decoder 115 is controlled so that the audio packets of the corresponding title are decoded.

Figure 21:
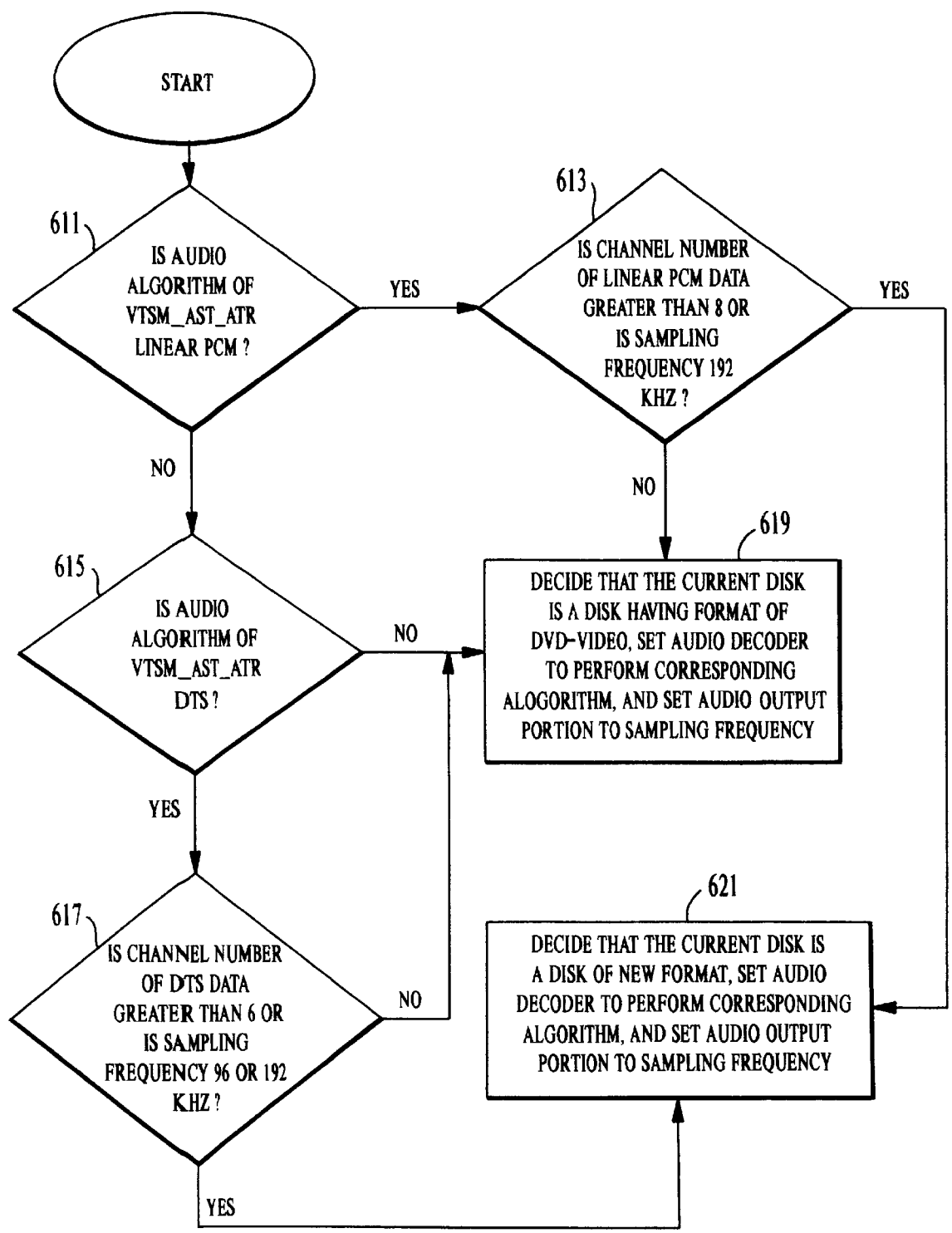
FIG. 21 is a flow chart of illustrating the procedure of setting the audio decoder shown in FIG. 20.

FIG. 21 shows the flow chart of setting the audio decoder 115 in steps 517 and 525 of FIG. 20. Referring to FIG. 21, an operation will be described in which the system controller 111 sets the audio decoder 115 according to VTS_AST_ATR and VTSM_AST_ATR. Here, the audio coding mode is assumed as linear PCM audio or DTS coding audio.

First, the system controller 111 analyzes the audio coding mode of VTS_AST_ATR and VTSM_AST_ATR in step 611, to thereby check the coding mode of the audio data stored in the DVD audio disk. Here, if the audio algorithm is linear PCM, system controller 111 senses this in step 611, and proceeds in step 613 to check whether the number of channels of the linear PCM audio data is greater than 8 or the sampling frequency is 192 KHz in step 613. In this case, the audio decoder 115 is set to perform the corresponding algorithm and uses output data buffer 215 in correspondence with the sampling frequency in step 621 if the number of channels of the linear PCM audio data is greater than 8 or the sampling frequency is 192 KHz because the disk is a new format of DVD audio disk in accordance with the embodiment of the present invention.

If the number of audio channels is not greater than 8 and the sampling frequency is below 192 KHz in step 613, the audio has the same format as that of the DVD video disk so that system controller 111 sets audio decoder 115 and output data buffer 215 in correspondence with the sampling frequency in order to perform the corresponding algorithm in step 619.

If the audio algorithm is not linear PCM in step 611, step 615 checks whether the audio algorithm of VTS_AST_ATR and VTSM_AST_ATR is DTS or not. Here, if the disk is DTS audio, it is checked in step 617 whether the number of audio channels is greater than 6 or the sampling frequency is 96 or 192 KHz. Here, if so, step 621 is carried out because this disk is a new format of DVD audio disk. However, if the number of channels of the DTS data is below 6 and the sampling frequency is 48 KHz, step 619 progresses because the disk has the same audio format as that of the DVD video disk.

Figure 22:
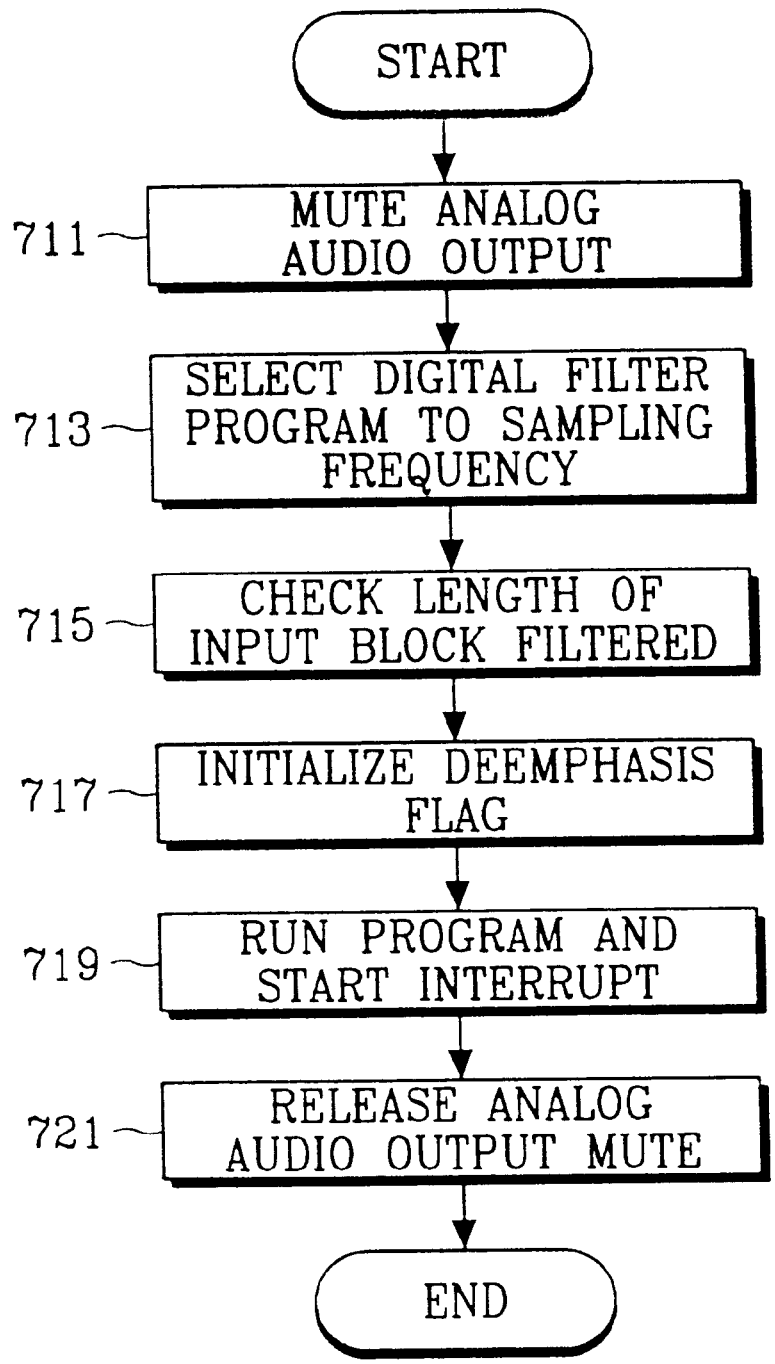
FIG. 22 shows the procedure of initializing the audio output shown in FIG. 20.

After setting the audio decoder 115, system controller 111 performs the procedure of FIG. 22, initializing the high-bit high-sampling digital filter 116 and the high-performance digital to analog converters and analog audio circuitry 117. System controller 111 controls the high-performance digital to analog converters and analog audio circuitry 117 in step 711 to mute the analog audio output. In step 713, the high-bit high-sampling digital filter 116 is controlled to select a digital filter program according to the sampling frequency, and in step 715, the length of an input block to be filtered is determined. System controller 111 initializes the deemphasis flag in step 717, and operates the program in step 719 to start the interrupt. Then, the system controller 111 controls the audio output 117 in step 721, to release the analog audio output mute.

Figure 23:
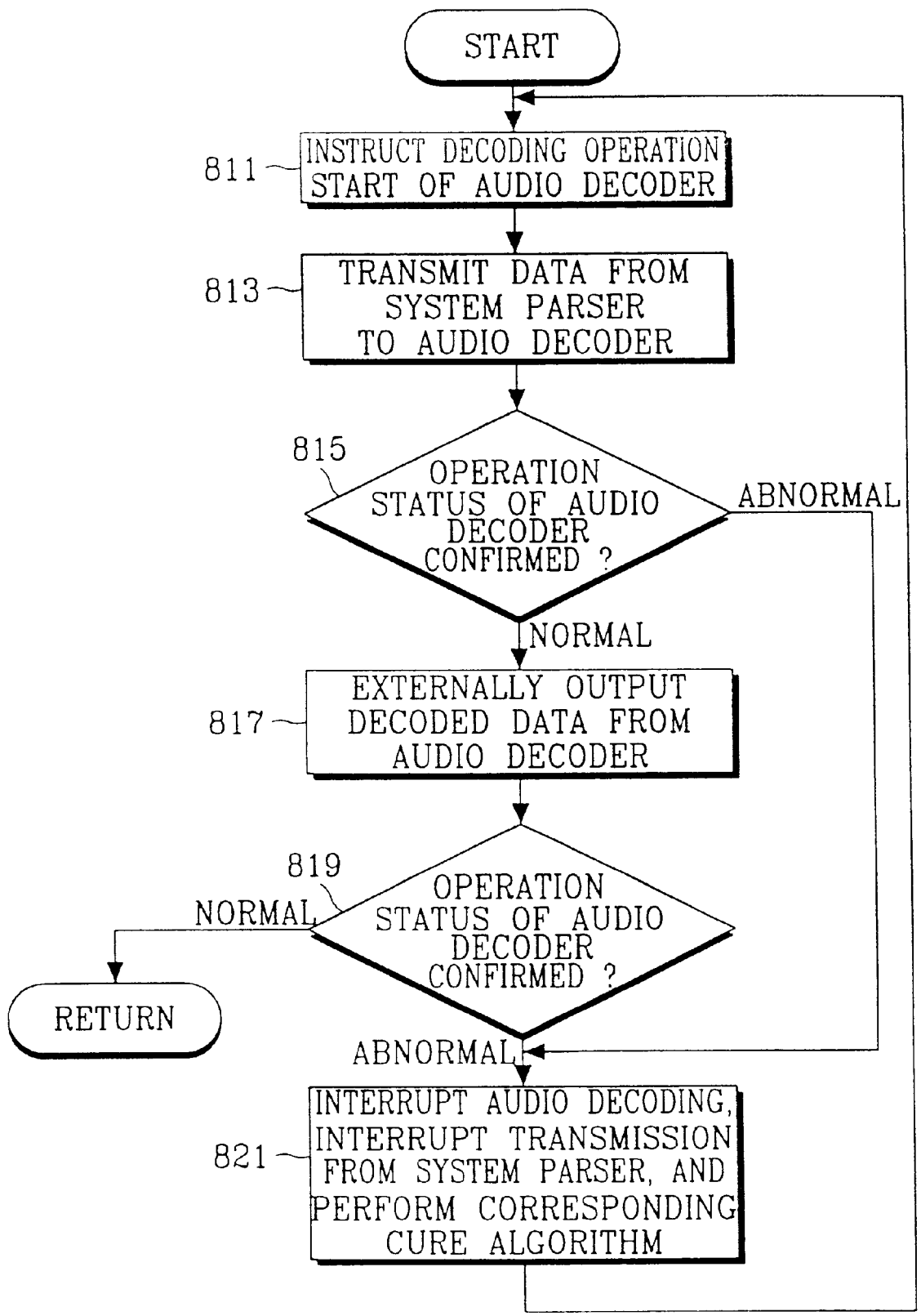
FIG. 23 is a flow chart of illustrating the procedure of controlling the operation of the audio decoder.

After setting the audio decoder according to the VTSI_MAT information through the procedure of FIGS. 20, 21 and 22, the system controller 111 analyzes the audio packs stored in the corresponding data area of the disk, and reproduces the audio data stored in the disk, as in FIG. 23.

System controller 111 controls the audio decoder 115 set in step 811 to instruct the decoding start. In step 813, the system selector 212 is controlled to transmit the received audio data to decoder 213 or 214 having a corresponding audio algorithm. Then, the corresponding decoder 213 or 214 decodes the audio data of the corresponding algorithm. Here, the system controller 111 checks the operation status of the decoder 213 or 214 in step 815. If there occurs decoding trouble, step 821 progresses to control the currently operating decoder to interrupt the decoding operation. Then, the system selector 212 is controlled to interrupt the transmission of data, drives a cure algorithm in accordance with the trouble, and returns to step 811.

If the currently operating decoder normally runs in step 815, step 817 externally outputs the decoded audio data through the output data buffer 215 or the digital audio formatter 216 in step 817. In step 819, the operation status of the audio decoder 115 is checked. If there occurs a decoding trouble, step 821 progresses, or if not, the step returns to decode the next audio data.

Figure 24:
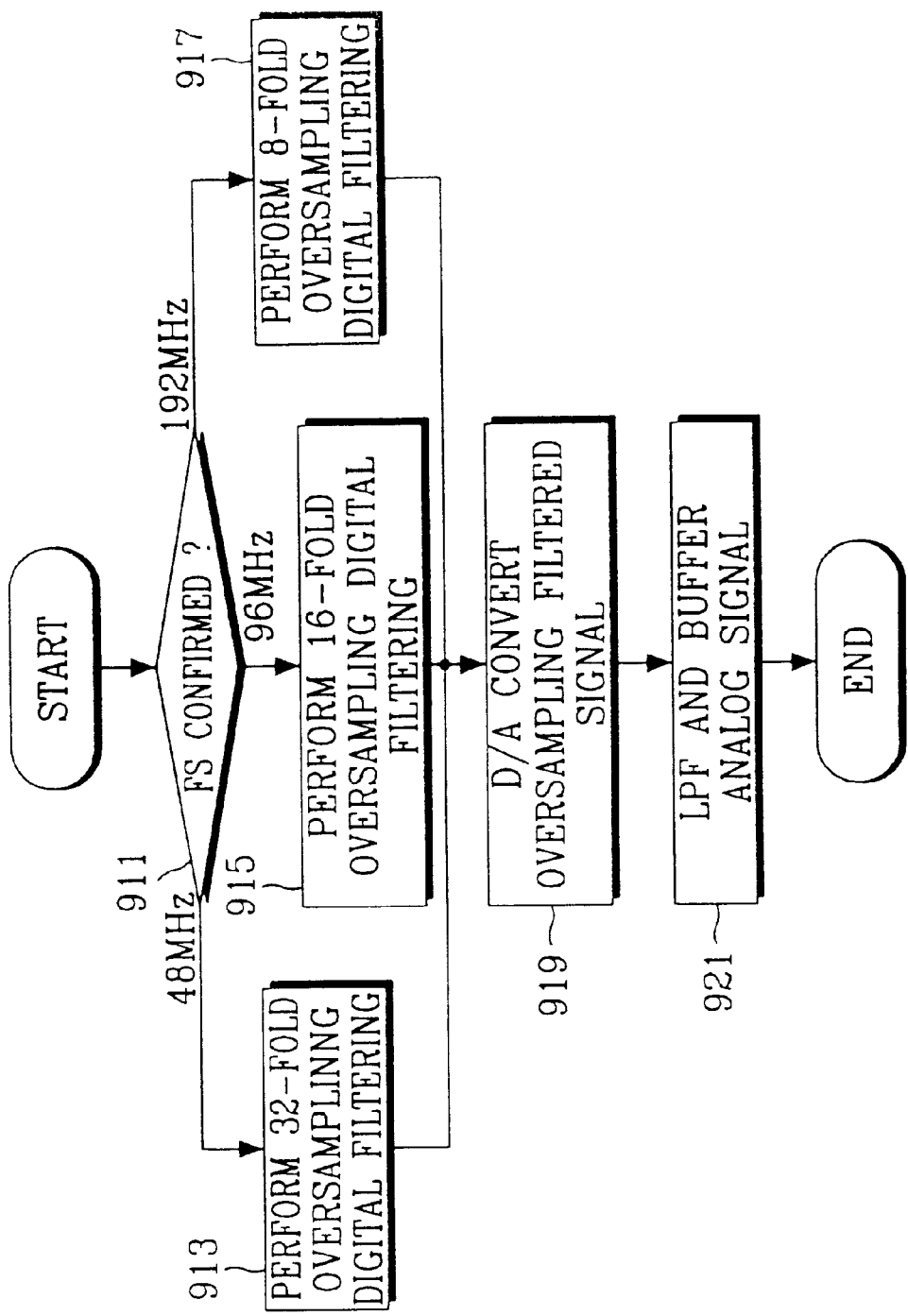
FIG. 24 is a flow chart of illustrating the procedure of controlling the operation of the audio output.

If the decoding of the audio stream is finished in the audio decoder 115, the system controller 111 controls the high-bit high-sampling digital filter 116 and the high-performance digital to analog converters and analog audio circuitry 117 through the procedure of FIG. 24, and converts the decoded audio data to an analog audio signal. If the decoded audio data is output from the audio decoder 115, the system controller 111 controls the high-bit high-sampling digital filter 116 through steps 911–917, and performs digital filtering corresponding to the sampling frequency. First of all, the system controller 111 checks the sampling frequency, and performs the oversampling digital filtering according to 48, 96, or 192 KHz. Here, if the sampling frequency is 48 KHz, 32-fold oversampling digital filtering is performed. If the frequency is 96 KHz, 16-fold oversampling digital filtering is performed. In case of 192 KHz, 8-fold oversampling digital filtering is performed.

After performing the oversampling digital filtering corresponding to the sampling frequency, the system controller 111 controls the high-performance digital to analog converters and analog audio circuitry 117 in step 919 to convert the digitally filtered audio signal to an analog audio signal, and in step 921, the converted analog audio signal is low-pass filtered and buffered in the audio band.

As described above, the DVD audio disk of the present invention is capable of recording audio data at a maximum sampling frequency of 192 KHz and 24 bits of quantized audio data, as well as greatly extending the number of audio channels. Therefore, if the audio data recorded on the DVD audio disk is reproduced faithfully, a good-quality audio signal is reproduced, which corresponds to multi-channel music. The number of recordable channels is limited by the data transmission velocity of a disk used, the sampling frequency of signal, and the number of quantization bits of the sample, but can be rendered multiple because the audio signal is recorded with a high sampling frequency and many quantization bits using a coding algorithm.

A general DVD video reproducing device has a specification not coming up to that of the DVD audio disk so that a DVD audio reproducing device capable of reproducing 192 KHz and 24 bits of quantized data may be disposed to the DVD video reproducing device according to its own performance. Here, the DVD audio reproducing device includes an audio decoder that performs decimation and requantization, and can reproduce multi-channel music, using a decoding algorithm in accordance with the coding mode recorded on the DVD audio disk.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

We claim:

1. A DVD audio disk to store audio data, comprising:

information areas each storing an audio title information management table; and respective data areas each storing audio packs of a linear pulse code modulated (PCM) mode;

wherein the audio title information management table includes a first, second or third number of quantization bits corresponding to the audio data, a first, second or third sampling frequency corresponding to the audio data, and information relative to a number of audio channels of the audio data, and each audio pack including audio packets having the first, second or third number of quantization bits, the first, second or third sampling frequency and the information relative to the number of channels which are recorded in the audio title management table, and the audio packets further containing coresponding portions of the audio data.

2. A DVD audio disk as claimed in claim 1, wherein the first, second and third quantization number of bits are 16, 20, and 24 bits, respectively, the first, second and third sampling frequencies are 48, 96, and 192 KHz, respectively, a maximum number of the audio channels being 13, and the number of channels being determined by the following equation 1:

$$N = \frac{Mbr}{Fs * Qb};$$

wherein,
Fs is the sampling frequency (Hz) of the audio data, Qb is the number of quantization bits of the audio data, Mbr is a maximum data transmission rate (Mbps) of the DVD audio disk, and N is a maximum number of recordable channels as determined by the maximum data transmission rate, sampling frequency, and the number of quantization bits of the DVD disk.

3. A DVD-Audio disk as claimed in claim 1, wherein if the audio coding mode is a compression coding system, a maximum number of said audio channels is determined by the following Eq. 2:

Eq. 2

$$N = \frac{Mb\gamma * Cc\gamma}{Fs * Qb};$$

wherein Fs is the sampling frequency(Hz), Qb is the quantization bit number, Mbγ is the maximum data transfer rate(Mbps) of the DVD-Audio disk, Ccγ is a compression ratio according to a DTS compression coding system and N is the maximum number of said audio channels determined by data transfer rate, sampling frequency and quantization bit number of the DVD-Audio disk.

4. A DVD audio disk as claimed in claim 1, wherein the pseudo-lossless psychoacoustic coding mode uses a Digital Theater System (DTS) compressive coding mode, the first, second and third numbers of quantization bits of the audio data prior to compression are 16, 20, and 24 bits, respectively, the first, second and third sampling frequencies are 48, 96, and 192 KHz, respectively, a maximum number of the audio channels being 16, and the number of channels being determined by the following equation 2:

$$N = \frac{Mbr * Ccr}{Fs * Qb};$$

wherein,
Fs is the sampling frequency (Hz) of the audio data, Qb is the number of quantization bits of the audio data, Mbr is a maximum data transmission rate (Mbps) of the DVD audio disk, Ccr is a compression ratio in accordance with the DTS compressive coding mode, and N is a maximum number of recordable channels as determined by the data transmission rate, the sampling frequency, the number of quantization bits, and the compression ratio of the DVD audio disk.

5. A DVD audio disk to store audio data, comprising:
information areas each storing a title information management table; and
respective data areas each storing sequential audio packs;
wherein the DVD audio disk conforms to the MPEG2 system layer standards;
wherein
the title information management table has an audio stream attribute area which includes an audio coding mode, a number of quantization bits, and a sampling frequency related to the audio packs, and information related to the number of audio channels
each of the audio packs includes a pack header and audio packets;
each of the audio packets includes a packet header, sub-stream ID, audio frame information, audio data information, and a portion of the audio data; and
the number of channels of audio data received is determined by the following equation 2:

$$N = \frac{Mbr * Ccr}{Fs * Qb};$$

and wherein,
Fs is the sampling frequency (Hz), having a value of one of 48 KHz, 96 KHz and 192 KHz, Qb is the number of quantization bits having a value of one of 16 bits, 20 bits, and 24 bits, Mbr is a maximum data transmission rate (10.08 Mbps) of the DVD audio disk, Ccr is a compression ratio in accordance with a compressive coding mode, and N is a maximum number of recordable channels as determined by the data transmission rate, the sampling frequency, the number of quantization bits, and the compression ratio of the DVD audio disk.

6. A DVD audio disk reproducing device comprising:
a data receiver to receive audio data reproduced from a disk;
a controller to analyze the audio data reproduced from the disk to thereby generate an audio control signal containing an audio coding mode, a sampling frequency, a number of channels and quantization information;
an audio decoder having a plurality of decoders, one of the plurality of decoders to decode the audio data received after being selected according to the audio coding mode of the audio data, including multi-channel mixing, sampling frequency converting and requantizing the decoded audio data, according to the audio control signal; and
an audio output to convert the audio data into an analog audio signal.

7. A DVD audio disk reproducing device as claimed in claim 6, wherein the audio decoder comprises:
a stream selector to select one of a plurality of audio streams which form the audio data according to the audio coding mode;
a linear PCM decoder to decode the selected audio stream if the selected audio stream is a linear PCM audio stream output from the stream selector, the linear PCM decoder sampling frequency converting, multi-channel down mixing and requantizing the decoded audio data decoded according to the audio control signal; and
a data decoder to decode the selected audio stream if the selected audio stream is a compressed audio stream output from the stream selector, using a corresponding decompression algorithm, and to sampling frequency convert, multi-channel down mix and requantize the decoded audio data decoded according to the audio control signal.

8. A device for reproducing a DVD video/audio disk, comprising:
a data receiver to receive data retrieved from the disk;
a controller to analyze the data retrieved from the disk to discriminate a kind of the disk, the controller generating an audio control signal containing a video control signal, an audio coding mode, a sampling frequency, a number of channels and quantization information in case of the DVD video disk, or generating only the audio control signal in case of the DVD audio disk;
a stream parser to separate the analyzed data output from the data receiver into video and audio data;
a video decoder to decode the video data output from the stream parser;

a video output to NTSC encode the decoded video data, and convert the encoded video data to an analog video signal;

an audio decoder having a plurality of decoders, one of the decoders being selected according to the audio coding mode of the audio data to thereby decode the received audio data, including multi-channel mixing, sampling frequency converting and requantizing the audio data decoded, according to the audio control signal; and an audio output to convert the decoded audio data to an analog audio signal.

9. A DVD video/audio disk reproducing device as claimed in claim 8, wherein the audio decoder comprises:

a stream selector to select one of a plurality of audio streams which form the audio data according to the audio coding mode;

a linear PCM decoder to decode the selected audio stream if the selected audio stream is a linear PCM audio stream output from the stream selector, the linear PCM decoder sampling frequency converting, multi-channel down mixing and requantizing the decoded audio data according to the audio control signal; and a data decoder to decode the selected audio stream if the selected audio stream is a compressed audio stream output from the stream selector, using a corresponding decompression algorithm, the data decoder sampling frequency converting, multi-channel down mixing and requantizing the audio data decoded, according to the audio control signal.

10. A method for reproducing a DVD audio disk having information areas each having a title set information management table recorded therein, and respective data areas each having sequential audio packs recorded therein, the method comprising the steps of:

reading the title set information management table for a title to be reproduced, and confirming an audio coding mode, sampling frequency, quantization bit number and channel number of the audio data recorded relating to the title;

setting the audio decoding mode according to the confirmation;

controlling the DVD audio disk in a playback mode, decoding the audio data according to the set audio decoding mode, and performing sampling frequency conversion, multi-channel down mixing and requantization of the decoded data according to the audio coding mode to generate processed decoded audio data; and converting the processed decoded audio data to an analog signal.

11. A method for reproducing a DVD audio disk having information areas each having a title set information management table recorded therein, and respective data areas each having sequential audio packs recorded therein, the method comprising the steps of:

reading the title set information management table of a title to be reproduced, and discriminating a kind of the DVD disk recorded;

confirming video control information and audio control information containing a coding mode, sampling frequency, quantization bit number and channel number of the audio data in case of the DVD video disk in the discrimination step, or confirming only the audio control information in case of the DVD audio disk;

setting an audio decoding mode according to the confirmation in case of the DVD audio disk;

controlling the DVD audio disk in a playback mode, decoding the audio data according to an audio coding mode, and performing sampling frequency conversion, multi-channel down mixing and requantization of the decoded data according to the audio coding mode, to generate processed decoded data; and converting the processed decoded audio data to an analog signal.

12. A DVD audio disk to store audio data, comprising:

information areas each storing a title information table related to the audio data; and respective data areas teach storing the audio data having a sampling frequency of about 192 KHz.

13. The DVD audio disk as claimed in claim 12, wherein the audio data has one of 16, 20 and 24 quantization bits.

14. The DVD audio disk as claimed in claim 12, wherein the audio data has 24 quantization bits.

15. The DVD audio disk as claimed in claim 12, wherein the title information table includes the sampling frequency, the number of quantization bits, and a number of audio channels of the audio data.

16. The DVD audio disk as claimed in claim 15, wherein the title information table includes at least four bits to indicate the number of audio channels of the audio data.

17. The DVD audio disk as claimed in claim 12, wherein the title information table includes at least four bits to indicate a number of audio channels of the audio data.

18. The DVD audio disk as claimed in claim 15, wherein the title information table further comprises a maximum data transfer rate of the DVD audio disk, and said digital audio data is sampled at the sampling frequency and quantized in the number of quantization bits with a number of channels of said digital audio data limited by said maximum data transfer rate.

19. The DVD audio disk as claimed in claim 18, wherein the title information management table further comprises compression ratio information of coding of the audio data, and the number of channels of the audio data is also limited by the compression ratio information.

20. The DVD audio disk as claimed in claim 19, wherein the audio data is coded as pseudo-lossless psychoacoustic coding.

21. The DVD audio disk as claimed in claim 20, wherein the pseudo-lossless psychoacoustic coding is performed with a DTS coding system.

22. The DVD audio disk as claimed in claim 18, wherein the audio data is coded as linear pulse code modulated (PCM) coding.

23. The DVD audio disk as claimed in claim 15, wherein the maximum bit rate is approximately 10.08 Mbps and the number of channels is 13.

24. The DVD audio disk as claimed in claim 15, wherein the title set management information table includes VTS_MU_AST_ATR for information relating to up to eight audio channel of the audio data in a linear PCM mode, and information relating to additional audio channels of the audio data are stored in a reserved area of the information area after the VTS_MU_AST_ATR.

25. The DVD audio disk as claimed in claim 12, wherein the title set management information table has a plurality of audio stream attributes each having an audio coding mode, a quantization bit number, and a sampling frequency, wherein if the audio coding mode is linear pulse code modulated (PCM) audio, a maximum number of said audio channels is determined by the following Eq. 1:

Eq. 1

$$N = \frac{Mb\gamma}{Fs * Qb};$$

wherein Fs is the sampling frequency(Hz), Qb is the quantization bit number, Mbγ is the maximum data transfer rate(Mbps) of the DVD-Audio disk, and N is the maximum number of said audio channels determined by the data transfer rate, sampling frequency and quantization bit number of the DVD-Audio disk.

26. The DVD audio disk as claimed in claim 12, wherein the title set management information table has a plurality of audio stream attributes each having an audio coding mode, a quantization bit number, and a sampling frequency, wherein if the audio mode is a compression coding system, a maximum number of said audio channels is determined by the following Eq. 2:

Eq. 2

$$N = \frac{Mb\gamma * Cc\gamma}{Fs * Qb};$$

wherein Fs is the sampling frequency(Hz), Qb is the quantization bit number, Mbγ is the maximum data transfer rate(Mbps) of the DVD-Audio disk, Ccγ is a compression ratio according to a DTS compression coding system and N is the maximum number of said audio channels determined by data transfer rate, sampling frequency and quantization bit number of the DVD-Audio disk.

27. A DVD audio disk comprising:
information areas each storing an audio title having a title set management table with a plurality of audio stream attributes including an audio coding mode, a quantization bit number, a sampling frequency and decoding algorithm information relating to a number of audio channels of audio data,
respective data areas each including a plurality of audio packs having portions of said audio data corresponding to said decoding algorithm stored in said audio stream attribute and relating to the audio title;
wherein the number of audio channels is limited by a data transmission velocity of the DVD audio disk, the sampling frequency and the quantization bit number.

28. The DVD audio disk as claimed in claim 27, if the audio coding mode is linear pulse code modulated (PCM) audio, a maximum number of said audio channels is determined by the following Eq. 1:

Eq. 1

$$N = \frac{Mb\gamma}{Fs * Qb};$$

wherein Fs is the sampling frequency(Hz), Qb is the quantization bit number, Mbγ is the maximum data transfer rate(Mbps) of the DVD-Audio disk, and N is the maximum number of said audio channels determined by the data transfer rate, sampling frequency and quantization bit number of the DVD-Audio disk.

29. The DVD audio disk as claimed in claim 27, wherein a compression rate of the audio data is between 1:1 and 5:1 for pseudo-lossless psychoacoustic coding.

30. The DVD audio disk as claimed in claim 24, wherein the compression rate of the audio data is 4:1 for the pseudo-lossless psychoacoustic coding.

31. The DVD audio disk as claimed in claim 24, wherein each title has corresponding amounts of the audio data having a sampling frequency of one of approximately 48, 96, and 192 KHz, a quantization bit number of one of 16, 20, and 24.

32. The DVD audio disk as claimed in claim 31, wherein the DVD audio disk has a maximum data transmission rate of approximately 10.08 Mbps.

33. The DVD audio disk as claimed in claim 27, wherein the title set management information table includes VTS_MU_AST_ATR for information relating to up to eight audio channel of the audio data in a linear PCM mode, and information relating to additional audio channels of the audio data are stored in a reserved area of the information area after the VTS_MU_AST_ATR.

34. The DVD audio disk as claimed in claim 27, wherein each of said audio packs comprises:
a pack header;
a packet header;
a sub-stream identification value;
stuffing frame information;
audio frame information; and
one of said portions of said audio data.

35. The DVD audio disk as claimed in claim 34, wherein said pack header is 14 bytes, said packet header is 1 byte, said sub-stream identification value is 1 byte, said stuffing frame information is 1 byte, said audio frame information is 3 bytes, and said one portion of said audio data is between 1 and 2013 bytes of linear pulse code modulated (PCM) data.

36. The DVD audio disk as claimed in claim 27, wherein each of said audio packs comprises:
a pack header;
a packet header;
a sub-stream identification value;
audio frame information; and
one of said portions of said audio data.

37. The DVD audio disk as claimed in claim 36, wherein the pack header is 14 bytes and each audio packet is between 1 and 2021 bytes of pseudo-lossless psychoacoustic data.

38. A DVD audio disk to store audio data, comprising:
information areas each storing a title set management information table related to the audio data; and
respective data areas each storing the audio data in a digital theater system (DTS) mode, wherein the audio data has more than six audio channels.

39. A DVD audio disk to store audio data, comprising:
information areas each storing a title set management information table related to the audio data; and
data areas each storing the audio data in a digital theater system (DTS) mode, wherein the audio data has a sampling frequency of at least approximately 96 KHz.

40. A DVD audio disk to store audio data, comprising:
information areas each storing a title set management information table related to the audio data; and
respective data areas each storing the audio data in a digital theater system (DTS) mode, wherein the audio data has a sampling frequency of approximately 192 KHz.

41. A DVD audio disk to store audio data, comprising:
information areas each storing a title information management table; and
respective data areas each storing a pseudo-lossless psychoacoustic coding mode;

wherein the title information management table includes a first, second or third number of quantization bits corresponding to the audio data, a first, second or third sampling frequency corresponding to the audio data, and information relative to a number of audio channels of the audio data, and each audio pack including audio packets having the first second or third number of quantization bits, the first, second or third sampling frequency and the information relative to the number of channels which are recorded in the title management table, and the packets further containing corresponding portions of the audio data.

42. An apparatus to reproduce data from a DVD disk, comprising:

a reading unit to read the data from the DVD disk;

a system controller to generate an audio control signal including an audio coding mode, a sampling frequency, and number of channels, and quantization information of audio data of the data stored on the DVD disk; and an audio decoder including a plurality of decoders, wherein said system controller selects one of the plurality of decoders, based upon the audio control mode, to decode the audio data, including sampling frequency converting and requantizing the decoded audio data, according to the audio control signal.

43. The apparatus as claimed in claim 42, further comprising:

a data receiver to corrects errors in the read data;

said one decoder to decode said corrected data, to generate the decoded audio data;

a sampling digital filter to filter the decoded data; and a digital/analog converter to convert the decoded data to an analog audio signal.

44. The apparatus as claimed in claim 43, wherein said audio decoder comprises:

a stream selector to determine whether said corrected data is linear pulse code modulated (PCM) coded or compression coded;

a linear PCM decoder to decode said linear PCM data to processed data according to a linear PCM decoding method;

a coding data decoder to decode said compression coded data to said processed data according to a corresponding compression decoding method; and a digital formatter to format said processed data as said decoded data.

45. The apparatus as claimed in claim 42, wherein said system controller discriminates whether the DVD disk is a DVD audio disk or a DVD video disk and controls reproduction of the DVD disk in a DVD video format if the DVD disk is a DVD video disk.

46. The apparatus as claimed in claim 45, further comprising:

a data receiver to corrects errors in the read data;

said audio decoder being an audio/video decoder to decode the corrected data;

a video output circuit to convert the decoded data to an analog video signal, if the decoded data is indicative of video information and said system controller reproduces the data of the DVD video disk in the DVD video format;

a digital filter to filter the decoded data if the decoded data is indicative of audio information; and an audio output circuit to convert the filtered data to an analog audio signal.

47. The apparatus as claimed in claim 46, wherein said video output circuit encodes said decoded data in NTSC to generate said analog video data.

48. The apparatus as claimed in claim 46, wherein said audio/video decoder comprises:

a stream parser to divide said corrected data which is indicative of the video information from the corrected data which is indicative of the audio information;

a video decoder to decode the corrected data indicative of the video information, to generate the decoded data indicative of the video information; and an audio decoder to decode the corrected data indicative of the audio information, to generate the decoded in formation indicative of the audio information.

49. The apparatus as claimed in claim 48, wherein said plurality of decoders comprise:

a linear PCM decoder;

a Dolby AC-3 decoder;

a coding data decoder; and an MPEG decoder;

wherein said system controller drives the corresponding one of said linear PCM decoder, Dolby AC-3 decoder, coding data decoder, and MPEG decoder, to decode the corrected data indicative of the audio information based upon a coding format of the corrected data indicative of the audio information.

50. The apparatus as claimed in claim 42, wherein the audio data has a sampling frequency of 192 Khz.

51. The apparatus as claimed in claim 42, wherein the audio data is in a digital theater system (DTS) mode, and has more than six audio channels.

52. The apparatus as claimed in claim 42, wherein the audio data is in a digital theater system (DTS) mode, and has a sampling frequency of at least approximately 96 KHz.

53. The apparatus as claimed in claim 42, wherein the audio data is in a digital theater system (DTS) mode, and has a sampling frequency of approximately 192 KHz.

54. An apparatus to reproduce data from a disk which is a DVD audio disk and from a DVD video disk, comprising:

a reading unit to read the data from the disk;

a system controller to distinguish the disk as the DVD audio disk or the DVD video disk; and an audio decoder including a plurality of decoders, wherein said system controller selects one of the plurality of decoders, based upon an audio control mode of the data and the determination of whether the disk is a DVD video disk or a DVD audio disk, to decode the data if the data is audio data.

55. The apparatus as claimed in claim 54, further comprising a video decoder to decode the data if the disk is a DVD video disk and the data is video data.

56. A method for reproducing data from a DVD disk, comprising the steps of:

(a) reading a title set management table of a title to be reproduced;

(b) reading VTSM_AST_ATR of the title set management table to determine a coding mode of the data; and (c) decoding the data based upon the determined coding mode.

57. The method as claimed in claim 56, wherein:

(b1) said step (b) further comprises the step of reading a sampling frequency and number of quantization bits; and (c1) said step (c) further comprises the step of decoding the data based upon the sampling frequency and the number of quantization bits.

58. The method as claimed in claim 57, wherein the sampling frequency is 192 KHz, the data is audio data, and said step (c1) decodes the audio data of 192 KHz in accordance with the decoding algorithm and the number of quantization bits.

59. The method as claimed in claim 57, further comprising the step of discriminating whether is the DVD disk is a DVD video disk or a DVD audio disk based upon the coding mode, sampling frequency and number of quantization bits, wherein said step (c1) further comprises the step of decoding the data based upon whether is DVD disk is the DVD video disk or the DVD audio disk.

60. The method as claimed in claim 57, comprising the steps of:
(c1) muting an analog audio output of the decoded data;
(c2) selecting a digital filter program according to the sampling frequency;
(c3) determining a length of the decoded data;
(c4) initializing a deemphasis flag;
(c5) starting an interrupt; and
(c6) releasing the mute of the analog audio output.

61. The method as claimed in claim 57, comprising the steps of:
performing 32-fold oversampling digital filtering of the decoded data if the sampling frequency is 48 KHz, 16-fold oversampling of the decoded data if the sampling frequency is 96 KHz, and performing 8-fold oversampling digital filtering of the decoded data if the sampling frequency is 192 KHz.

62. The method as claimed in claim 56, wherein said step (c) comprises the steps of:
determining whether a channel number of the data is greater than eight or has a sampling frequency of approximately 192 KHz if the coding mode is a linear pulse code modulated (PCM) mode, and determining the DVD disk to be a DVD audio disk if the channel number is greater than 8 or has the sampling frequency of 192 KHz in the linear PCM mode;
determining whether the channel number is greater than 6 or the sampling frequency is at least 96 KHz if the coding mode is a digital theater system (DTS) mode, and determining the DVD disk to be the DVD audio disk if in the DTS mode the channel number is greater than six or the sampling frequency is at least 96 KHz; and
otherwise determining the DVD disk to be a DVD video disk.

63. The method as claimed in claim 56, wherein said step (c) comprises the steps of:
(c1) determining whether the coding mode is a linear pulse code modulated (PCM) mode;
(c2) determining whether a channel number of the data is greater than eight or has a sampling frequency of approximately 192 KHz if the coding mode is the linear PCM mode, and determining the DVD disk to be a DVD audio disk if the channel number is greater than 8 or has the sampling frequency of 192 KHz;
(c3) determining whether the coding mode is a digital theater system (DTS) mode if the coding mode is not the linear PCM mode or said step (c2) determines that the channel number is not greater than eight or the sampling frequency is not approximately 192 KHz; and
(c4) determining whether the channel number is greater than 6 or the sampling frequency is at least 96 KHz if the coding mode is the DTS mode, and determining the DVD disk to be the DVD audio disk if in the DTS mode the channel number is greater than six or the sampling frequency is at least 96 KHz, otherwise determining the DVD disk to be a DVD video disk.

64. The method as claimed in claimed 56, comprising the steps of:
determining an operation status of the decoding of the data; and
interrupting the decoding if an abnormality on the operation status is determined, and then performing a cure algorithm to remove the abnormality.

65. The method as claimed in claim 56, further comprising the steps of:
(d) determining whether there is a menu in the title set management table;
(e) determining whether the menu is to be played back; and
(f) reproducing the menu to be played back.

* * * * *

UNITED STATES PATENT AND TRADEMARK OFFICE
CERTIFICATE OF CORRECTION

PATENT NO. : 5,987,417
DATED : November 16, 1999
INVENTOR(S) : Jung-Kwon HEO et al.

It is certified that error appears in the above-identified patent and that said Letters Patent is hereby corrected as shown below:

IN THE DRAWINGS

Figure 5B:
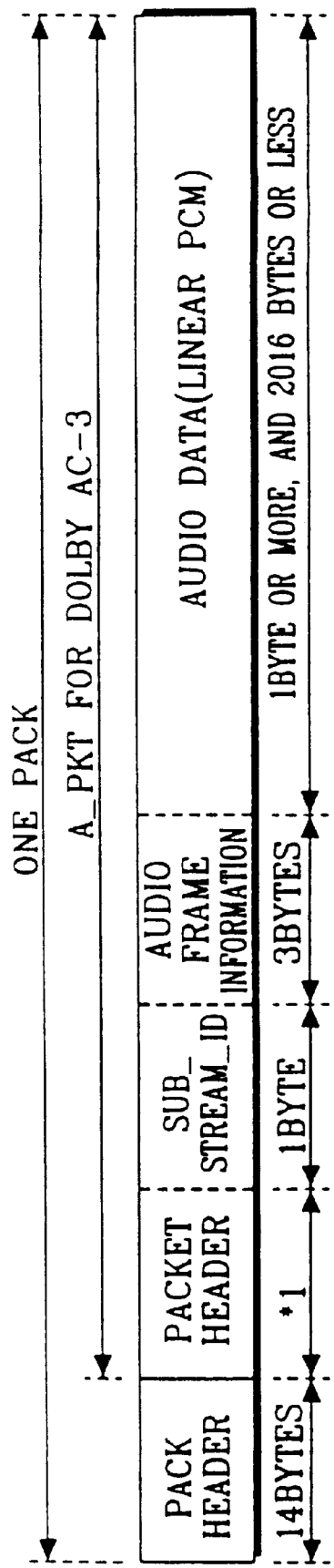
Figure 5C:
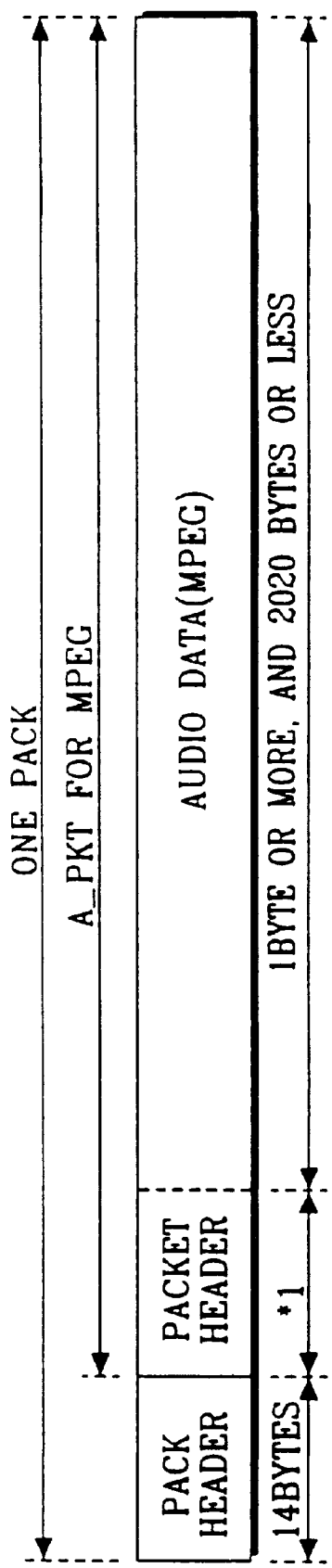
Figure 5D:
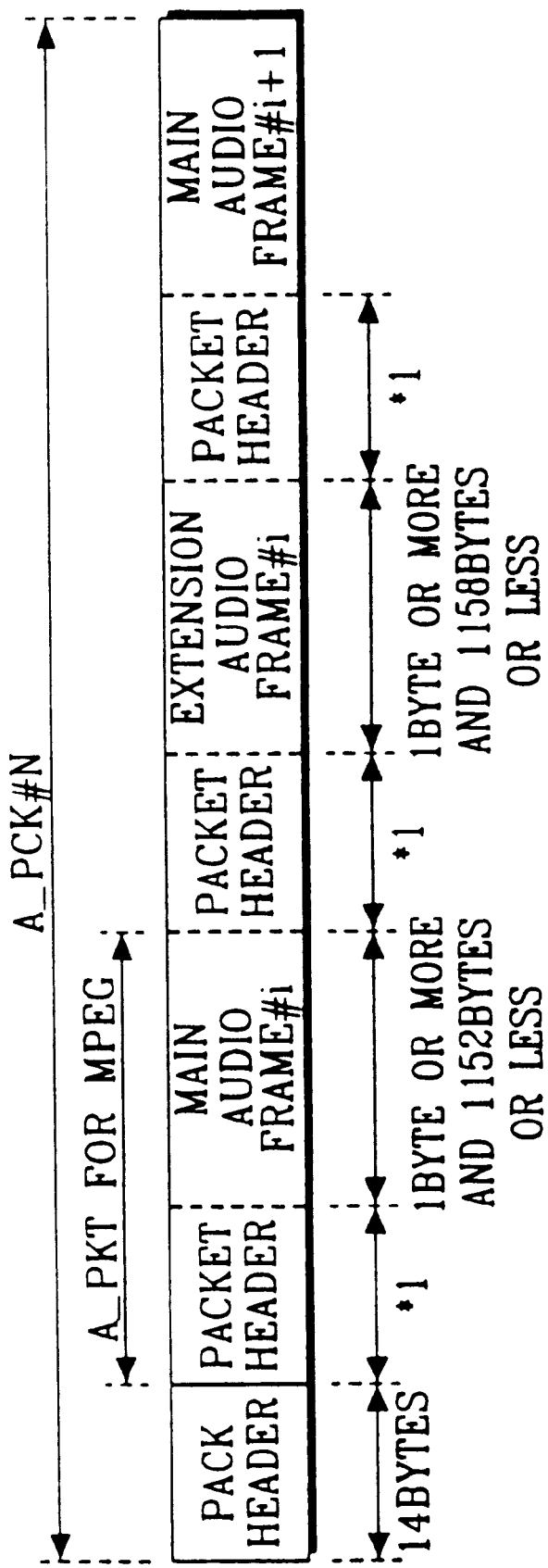
Figure 5E:
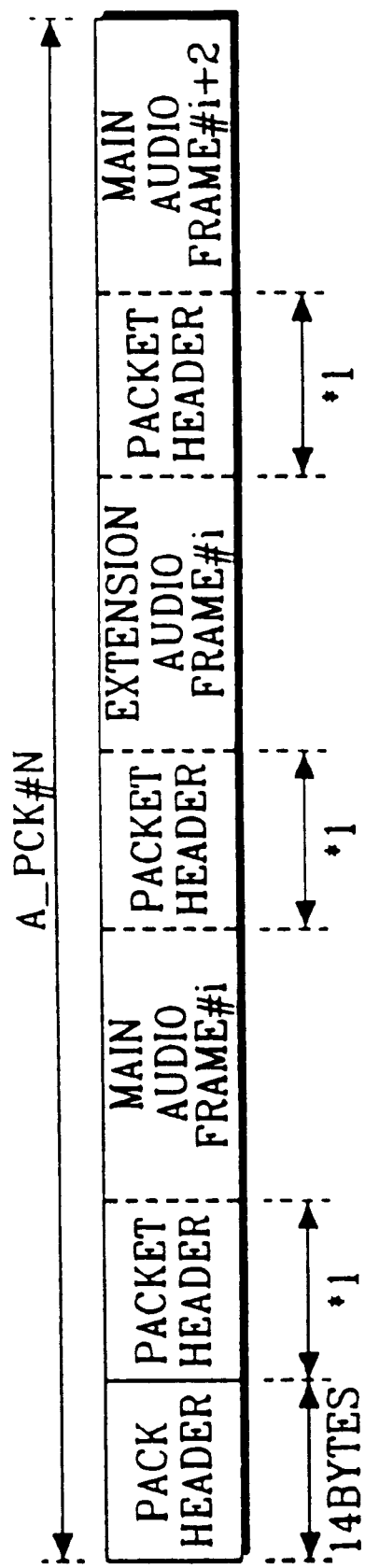
Figure 6:
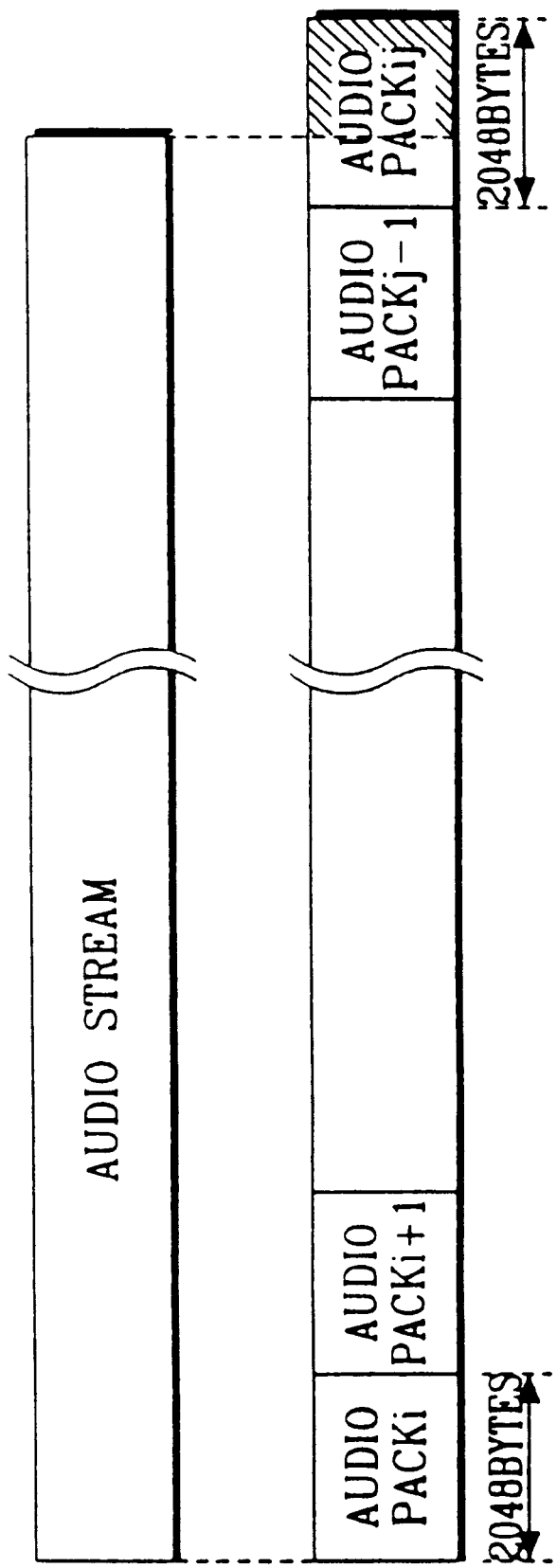
FIG. 6 shows the structure of the audio stream and audio pack in the conventional DVD video disk.
Figure 7:
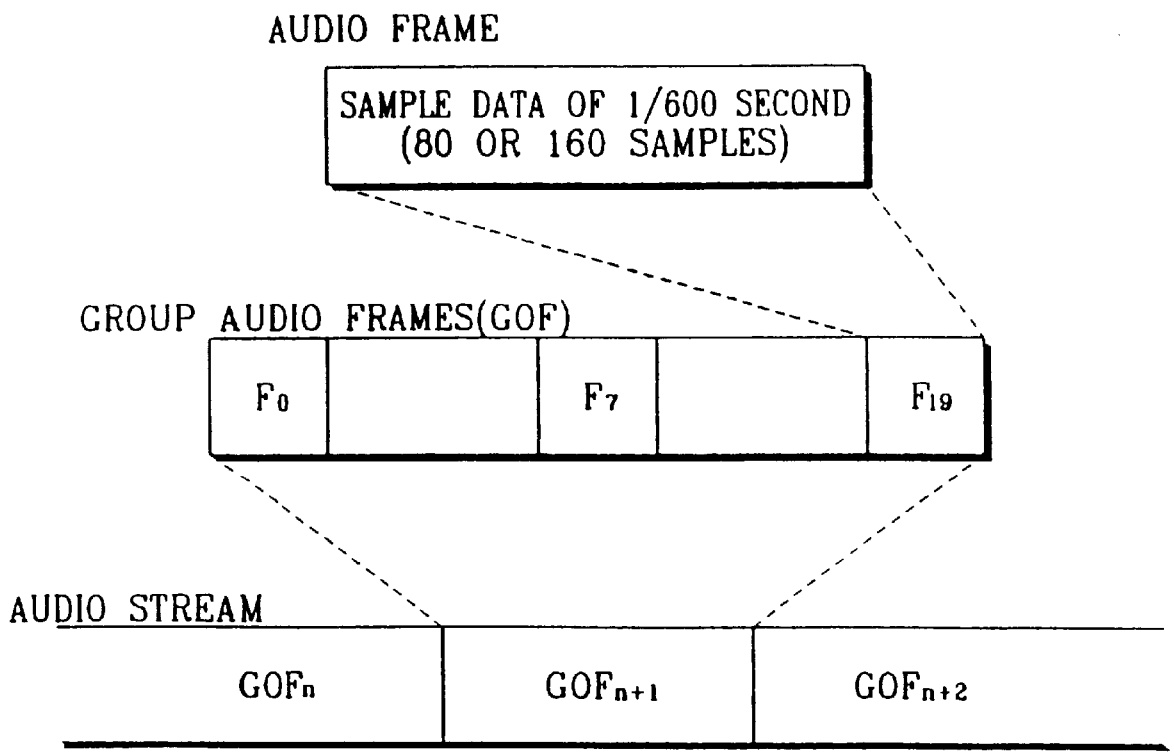
FIG. 7 shows the structure of the audio stream shown in FIG. 6 in the conventional DVD video disk.
Figure 8A:
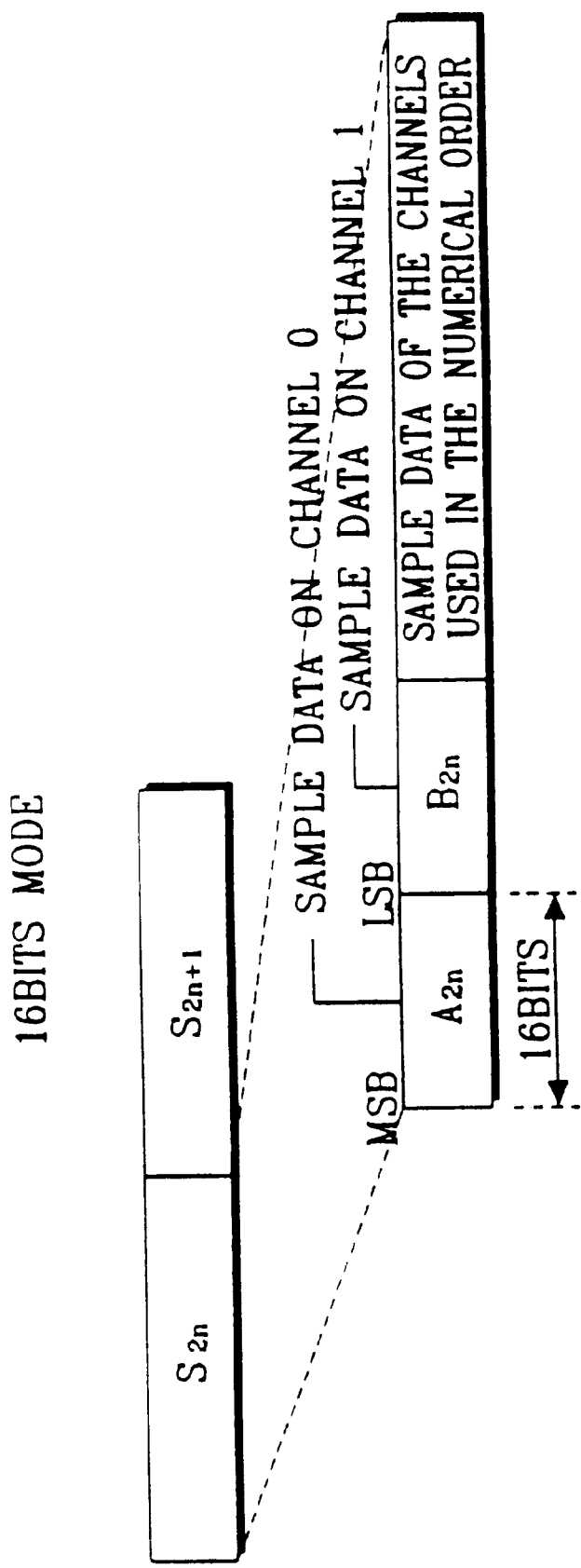
FIGS. 8A, 8B and 8C show the arrangements of sample data of the linear PCM audio in the conventional DVD video disk.
Figure 8B:
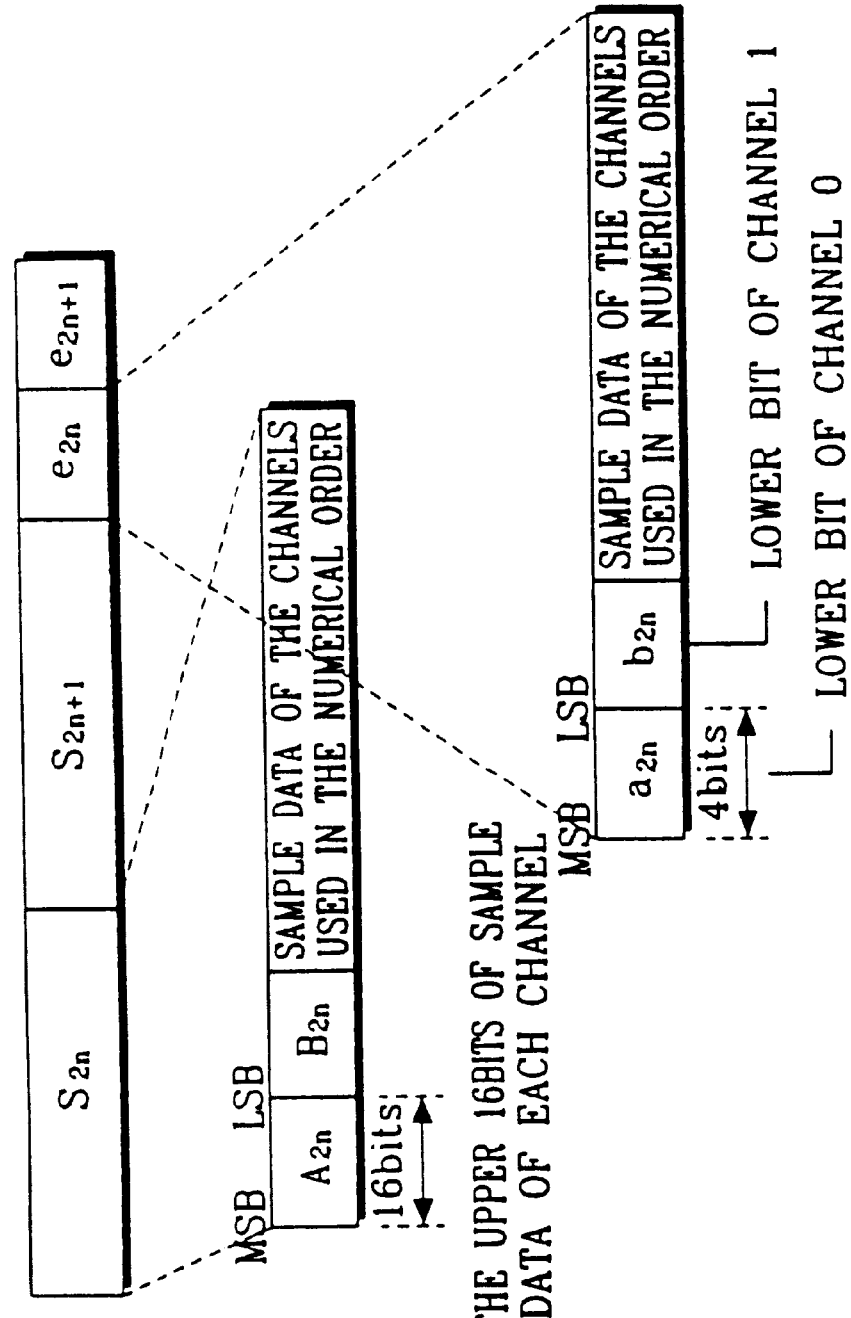
Figure 8C:
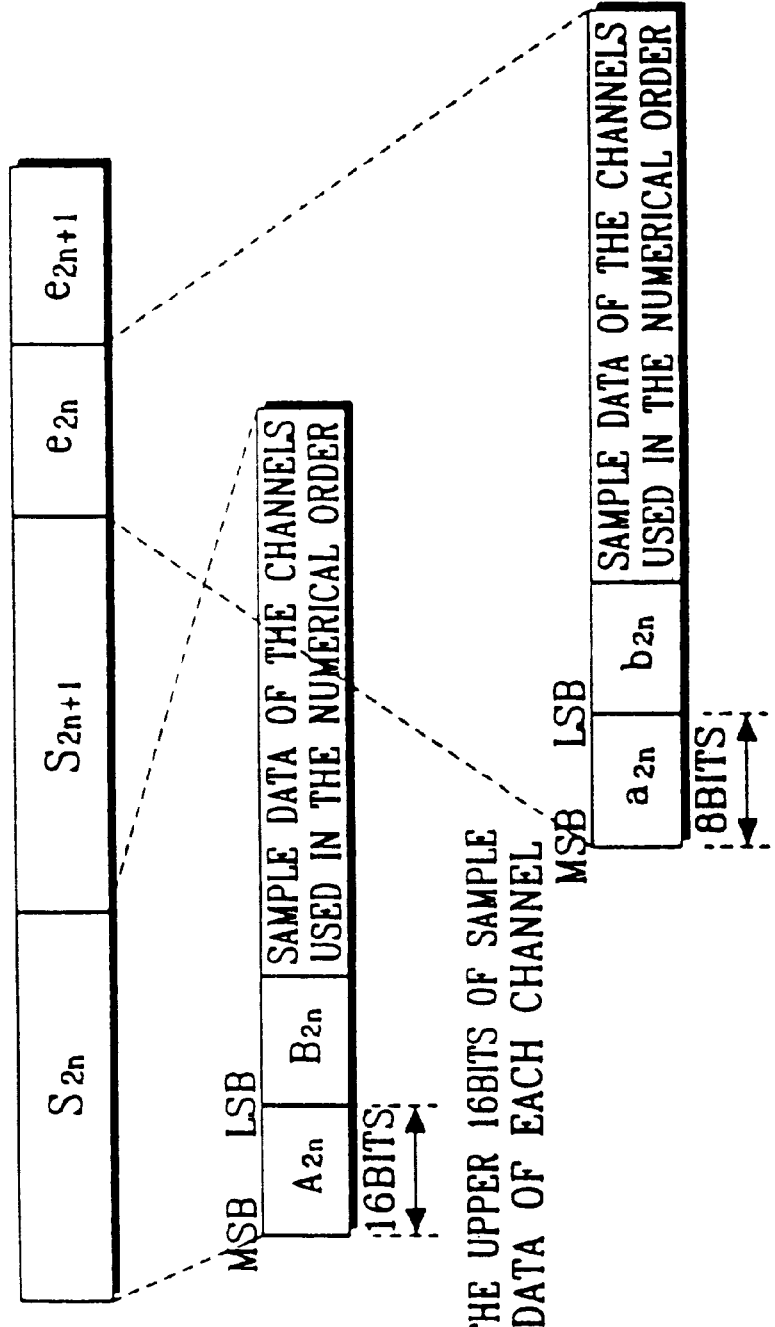
Figure 9:
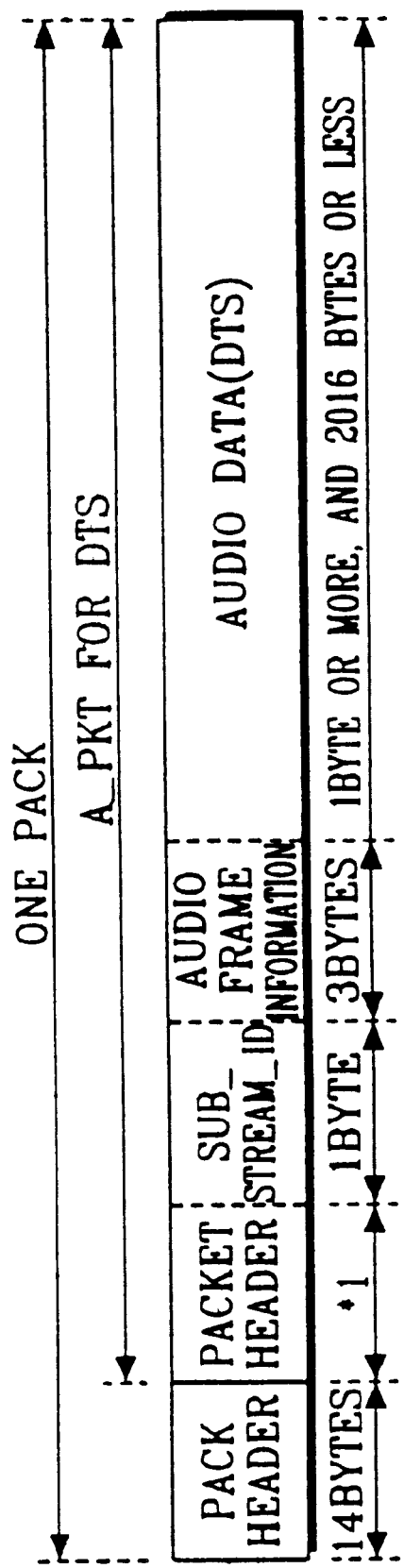
FIG. 9 shows the structure of the audio pack encoded in the conventional DVD video disk.
Figure 10:
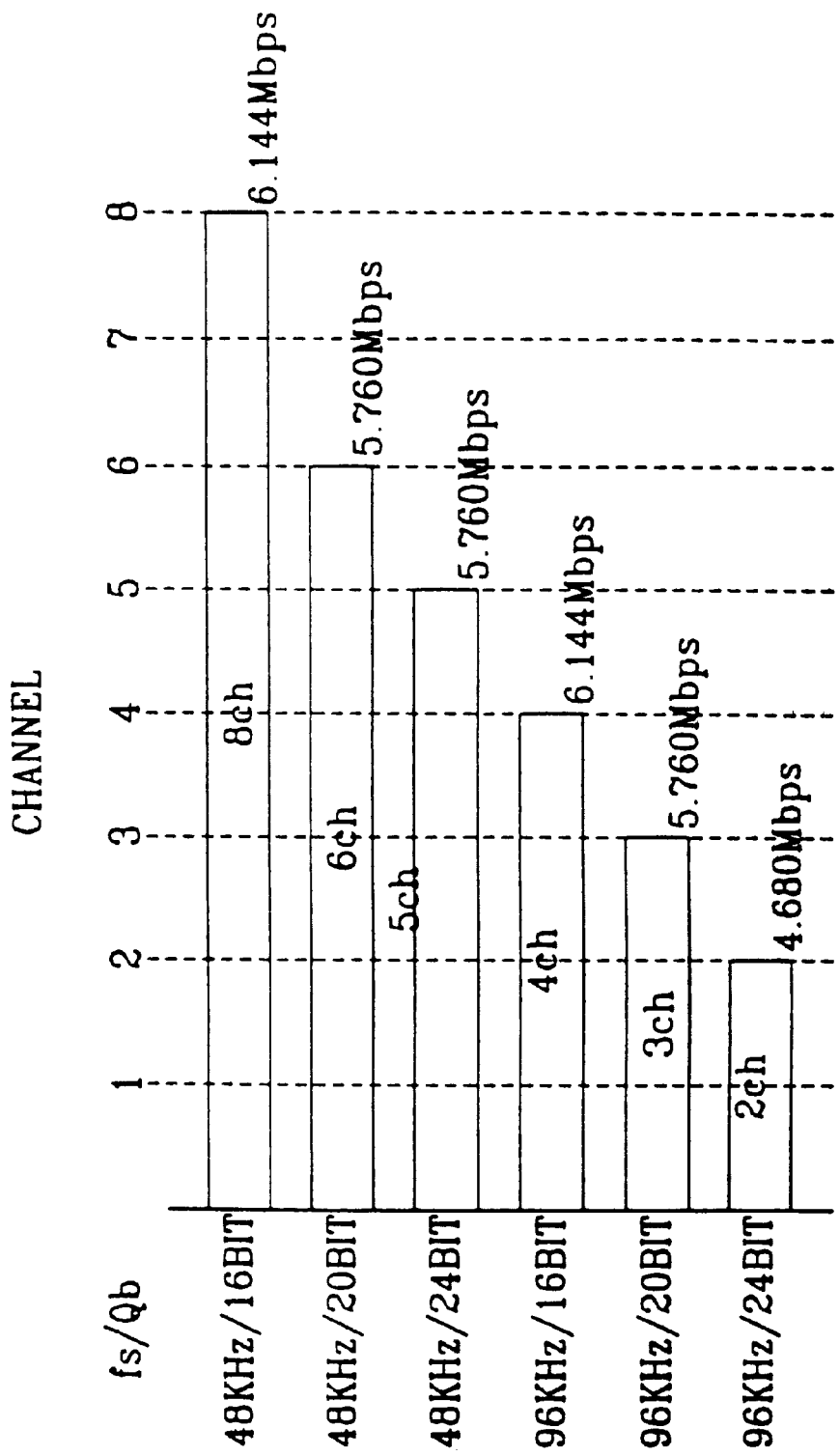
FIG. 10 shows the number of channels available of the linear PCM audio data in the conventional DVD video disk.

In FIG. 5B, "(LINEAR PCM)" should be --(AC-3)--.

Title page, item [54] and Column 1:
IN THE TITLE

"DVD AUDIO DISK REPRODUCING DEVICE AND METHOD THEREOF" should be --DVD AUDIO DISK, AND AUDIO DISK REPRODUCING DEVICE AND METHOD FOR REPRODUCING THE SAME--.

Signed and Sealed this

Twenty-sixth Day of September, 2000

Attest:

Q. TODD DICKINSON

*Attesting Officer*　　　　　*Director of Patents and Trademarks*